United States Patent
Hara et al.

(10) Patent No.: US 7,295,688 B2
(45) Date of Patent: Nov. 13, 2007

(54) METHOD AND APPARATUS FOR MATCHING STREAKED PATTERN IMAGE

(75) Inventors: Masanori Hara, Tokyo (JP); Hiroaki Toyama, Tokyo (JP)

(73) Assignee: NEC Corporation, Tokyo (JP)

( * ) Notice: Subject to any disclaimer, the term of this patent is extended or adjusted under 35 U.S.C. 154(b) by 839 days.

(21) Appl. No.: 10/639,512

(22) Filed: Aug. 13, 2003

(65) Prior Publication Data

US 2004/0032976 A1    Feb. 19, 2004

(30) Foreign Application Priority Data

Aug. 13, 2002    (JP)    ............................. 2002-236086

(51) Int. Cl.
*G06K 9/00*    (2006.01)

(52) U.S. Cl. ...................... 382/125; 382/124

(58) Field of Classification Search ........ 382/124–127, 382/115, 116; 340/5.53, 5.83; 235/380, 235/382, 382.5; 902/2–6
See application file for complete search history.

(56) References Cited

U.S. PATENT DOCUMENTS

| | | | |
|---|---|---|---|
| 4,310,827 A | 1/1982 | Asai | |
| 4,581,760 A | 4/1986 | Schiller et al. | |
| 4,646,352 A | 2/1987 | Asai et al. | |
| 4,947,442 A | 8/1990 | Tanaka et al. | |
| 5,631,971 A | 5/1997 | Sparrow | |
| 5,878,158 A | 3/1999 | Ferris et al. | |
| 6,072,895 A | 6/2000 | Bolle et al. | |
| 6,111,978 A * | 8/2000 | Bolle et al. | ................. 382/125 |
| 6,263,091 B1 * | 7/2001 | Jain et al. | ................... 382/125 |
| 6,901,155 B2 * | 5/2005 | Xia et al. | ................... 382/125 |
| 6,963,659 B2 * | 11/2005 | Tumey et al. | ................ 382/116 |
| 2004/0125993 A1 * | 7/2004 | Zhao et al. | ................. 382/124 |

FOREIGN PATENT DOCUMENTS

| | | |
|---|---|---|
| JP | 55-138174 | 10/1980 |
| JP | 59-000778 | 1/1984 |
| JP | 62-144289 | 6/1987 |
| JP | 62-207621 | 8/1987 |
| JP | 02-224076 | 9/1990 |
| JP | 7-121712 | 5/1995 |
| JP | 10-122493 | 5/1998 |

(Continued)

OTHER PUBLICATIONS

Isenor D.K., et al., "Fingerprint Identification Using Graph Matching", Pattern Recognition, Pergamon Press Inc., vol. 19, No. 2, 1986, pp. 113-122.

(Continued)

*Primary Examiner*—Vikkram Bali
(74) *Attorney, Agent, or Firm*—Young & Thompson

(57) ABSTRACT

A streaked pattern image matching method that matches a first streaked pattern image and a second streaked pattern image includes steps of: extracting data of skeleton pixels that indicate skeletons, which are lines obtained by thinning the streaks of each streaked pattern image; establishing correspondences between skeleton pixels by specifying pixels from among skeleton pixels of the second streaked pattern image that correspond to skeleton pixels of the first streaked pattern image; and, based on skeleton pixels of the first streaked pattern image for which the process of establishing correspondence has been carried out, rating the degree of matching between the first streaked pattern image and the second streaked pattern image and calculating a score that represents the degree of matching.

12 Claims, 35 Drawing Sheets

FOREIGN PATENT DOCUMENTS

| | | |
|---|---|---|
| JP | 11-195119 | 7/1999 |
| JP | 2000-20693 | 1/2000 |
| JP | 2000-57342 | 2/2000 |
| JP | 2002-074381 | 3/2002 |

OTHER PUBLICATIONS

Wahab A. et al., "Novel approach to automated fingerprint recognition", IEE Proceedings: Vision, Image and Signal Processing, Institution of Electrical Engineers, vol. 145, No. 3, Jun. 24, 1998, pp. 160-166.

Senior A.W. et al., "Improved fingerprint matching by distortion removal", IEICE Transactions on Information and Systems, Inst. Electron. Inf. & Commun, Jul. 2001, pp. 825-832.

Eshera M.A. et al., "A Graph Distance Measure For Image Analysis", IEEE Transactions of Systems, Man, and Cybernetics, IEEE, vol. SMC-14, No. 3, May 1, 1984, pp. 398-408.

T.Kobayashi, "A Fingerprint Verification Method Using Thinned Image Pattern Matching", Transactions of the Institute of Electronics, Information and Communication Engineers (IEICE), D-11 vol. J79-D-11, No. 3, pp. 330-340 (Mar. 1996).

* cited by examiner

FIG. 5A Mask pattern

| X4 | X3 | X2 |
|---|---|---|
| X5 | X0 | X1 |
| X6 | X7 | X8 |

1) $X_n=1$ indicates skeleton point exists, $X_n=0$ indicates pixel other than skeleton point
2) When $X_0=1$, $\Sigma X_n \leq 3$ ($X_n = X_1$ to $X_8$)
3) When $X_0=1$, none skeleton point of $X_1$ to $X_8$ neighbors FIG. 5B Example of ending point (E)

| 0 | 1 | 0 |
|---|---|---|
| 0 | 1 | 0 |
| 0 | 0 | 0 |

| 1 | 0 | 0 |
|---|---|---|
| 0 | 1 | 0 |
| 0 | 0 | 0 |

FIG. 5C Example of bifurcation (B)

| 1 | 0 | 1 |
|---|---|---|
| 0 | 1 | 0 |
| 0 | 1 | 0 |

| 1 | 0 | 1 |
|---|---|---|
| 0 | 1 | 0 |
| 1 | 0 | 0 |

| 0 | 1 | 0 |
|---|---|---|
| 0 | 1 | 0 |
| 1 | 0 | 1 |

FIG. 5D Example of continuous point (C)

| 0 | 1 | 0 |
|---|---|---|
| 0 | 1 | 0 |
| 0 | 1 | 0 |

| 1 | 0 | 0 |
|---|---|---|
| 0 | 1 | 0 |
| 0 | 0 | 1 |

| 1 | 0 | 0 |
|---|---|---|
| 0 | 1 | 0 |
| 0 | 1 | 0 |

FIG. 6A

Example 1 of intersection

| 1 | 0 | 1 |
|---|---|---|
| 0 | 1 | 0 |
| 1 | 0 | 1 |

↑

Intersection of skeleton is modified to two bifurcations

When direction of ridge is horizontal:

| 1 | 0 | 1 |
|---|---|---|
| 0 | 1 | 0 |
| 0 | 1 | 0 |
| 1 | 0 | 1 |

When direction of ridge is right-up:

| 0 | 1 | 0 | 1 |
|---|---|---|---|
| 0 | 0 | 1 | 0 |
| 0 | 1 | 0 | 0 |
| 1 | 0 | 1 | 0 |

FIG. 6B

Example 2 of intersection

| 0 | 1 | 0 |
|---|---|---|
| 1 | 1 | 1 |
| 0 | 1 | 0 |

↑

Change to unclear area (out of matching)

When intersection cannot be modified to two bifurcation, it is set to unclear area.

| Search Skeleton Data | | | | | |
|---|---|---|---|---|---|
| | Unit No. | Type | X | Y | Code8 |
| | 1 | X | 105 | 30 | 128 |
| | | C | 106 | 31 | 72 |
| | | C | 106 | 32 | 132 |
| | | C | 107 | 33 | 136 |
| | | C | 108 | 34 | 72 |
| | | C | 109 | 34 | 146 |
| | | B | 110 | 35 | 73 |
| | | | | | |
| | 2 | B | 110 | 35 | 73 |
| | | C | 110 | 36 | 68 |
| | | C | 110 | 37 | 68 |
| | | C | 110 | 38 | 68 |
| | | C | 110 | 39 | 68 |
| | | E | 110 | 40 | 4 |
| | | | | | |
| | 3 | X | 122 | 32 | 72 |
| | : | : | : | : | : |

FIG. 8

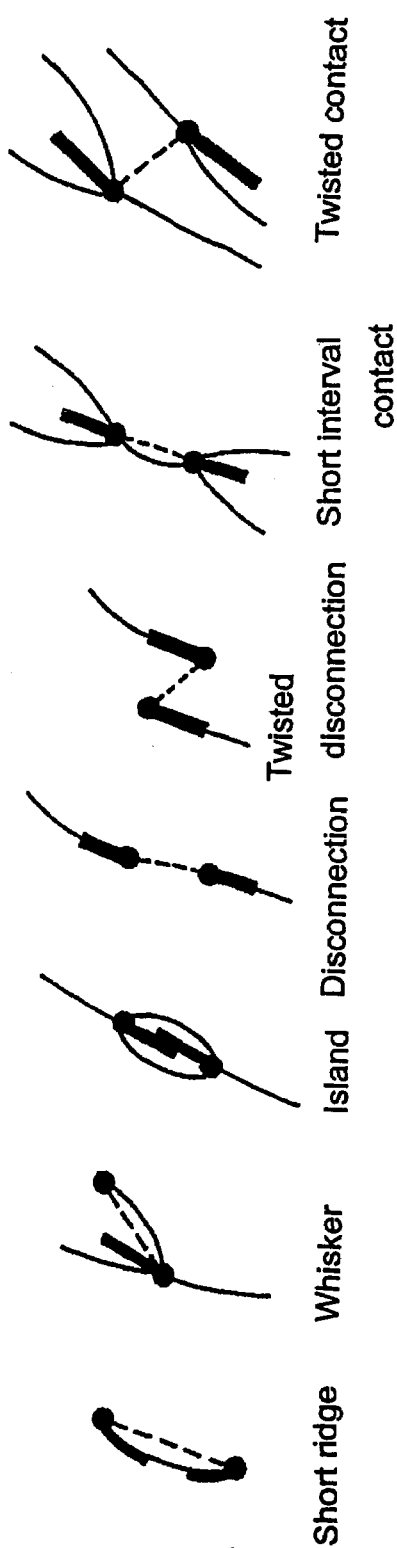

| Shape of Skeleton | Modification | Penalty |
|---|---|---|
| Short ridge | Deletion | Length of deleted skeleton |
| Whisker | Deletion | (Length of deleted skeleton) × (predetermined factor) |
| Island | a) Delete two skeleton constituting island<br>b) Smoothly connect two ending point | Length of added skeleton |
| Disconnection | Smoothly connect two ending point | Length of added skeleton |
| Twisted disconnection | Shorten two ending points by fixed length and then Smoothly connect them | Sum of deleted length and added length of skeleton |
| Short interval contact | a) Delete fixed length of lEach of five skeletons constituting two bifurcations<br>b) Delete all skeletons between two bifurcations<br>c) Smoothly connect four end points in parallel | Sum of length of added skeleton |
| Twisted contact | a) Delete fixed length of Each of five skeletons constituting two bifurcations<br>b) Smoothly connect two end points | Sum of length of added skeleton |

| Type of minutia | | Difference in ridge | Processing on F-side skeleton data and paired minutia list | Penalty |
|---|---|---|---|---|
| Search tmS | File tmF | rF−rS | | |
| E | E | 0 | No processing because of matching | 0 |
| E | B | 0 | Separate skeleton near BPM | 1 |
| E | B | −1 | Separate skeleton far from BPM | 1 |
| E | B | 1 | Delete from paired minutia list | 5 |
| E | E | −1 | Connect to skeleton near BPM and then separate skeleton near BPM | 2 |
| E | E | 1 | Connect to skeleton far from BPM and then separate skeleton far from | 2 |
| B | B | 0 | No processing because of matching | 0 |
| B | E | 0 | Connect to skeleton far from BPM | 1 |
| B | E | −1 | Connect to skeleton near BPM | 1 |
| B | E | 1 | Delete from paired minutia list | 5 |
| B | B | −1 | Separate skeleton near BPM and then connect to skeleton near BPM | 2 |
| B | B | 1 | Separate skeleton far from BPM and then connect to skeleton far from | 2 |
| E or B | E or B | ≥2 | Delete from paired minutia list | 5 |

FIG. 14

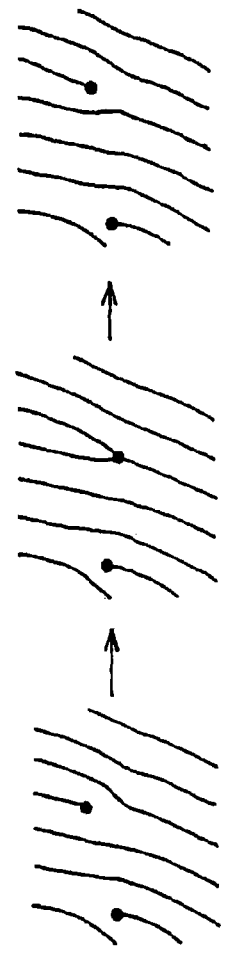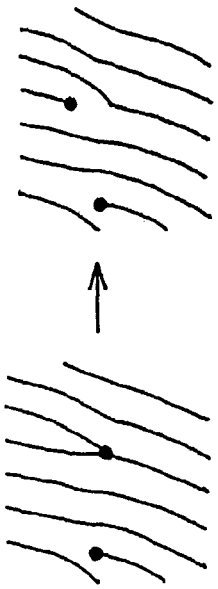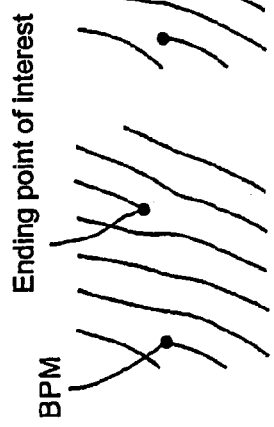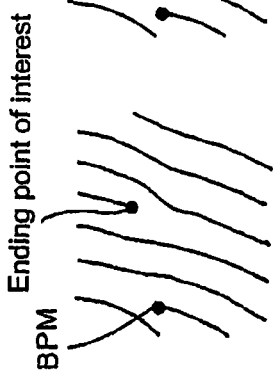
FIG. 16A
FIG. 16B

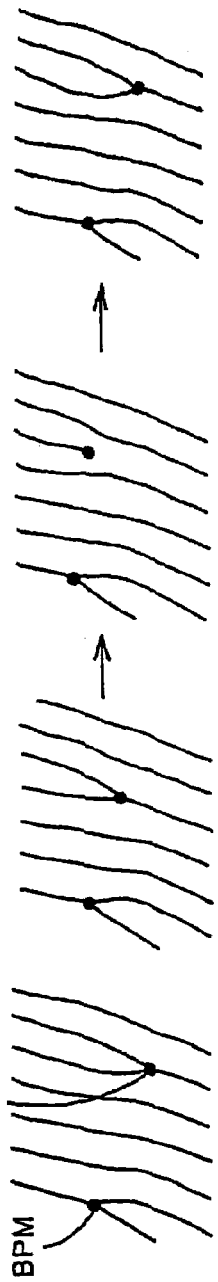

Skeleton Pair List

| Search Skeleton Data | | | File Skeleton Candidate | | | | Score |
|---|---|---|---|---|---|---|---|
| Unit No. | Type | X | Y | Unit No. | Type | X | Y | |
| 1 | X | 105 | 30 | 25 | C | 205 | 120 | 8 |
|   | C | 106 | 31 |    | C | 206 | 121 |   |
|   | C | 106 | 32 |    | C | 206 | 122 |   |
|   | C | 107 | 33 |    | C | 207 | 123 |   |
|   | C | 108 | 34 |    | C | 208 | 123 |   |
|   | C | 109 | 34 |    | C | 208 | 124 |   |
|   | B | 110 | 35 |    | X |     |     |   |
| 2 | B | 110 | 35 | 37 | B | 211 | 126 | 9 |
|   | C | 110 | 36 |    | C | 211 | 127 |   |
|   | C | 110 | 37 |    | C | 212 | 127 |   |
|   | C | 110 | 38 |    | C | 212 | 128 |   |
|   | C | 110 | 39 |    | C | 213 | 129 |   |
|   | E | 110 | 40 |    | E | 213 | 130 |   |
| 3 | X | 122 | 32 | 52 | X | 220 | 115 | 12 |
| ⋮ | ⋮ | ⋮ | ⋮ | ⋮ | ⋮ | ⋮ | ⋮ | ⋮ |

FIG. 20

Search-side skeleton

| Search-side skeleton | | File-side Skeleton | | Comment |
|---|---|---|---|---|
| Skeleton-of-interest side | Adjacent skeleton side | Corresponding skeleton side | Corresponding adjacent skeleton side | |
| Skeleton of interest | | Corresponding skeleton | | Used in all steps |
| Point of interest | | Corresponding point | | Used in all steps |
| Determinate paired minutiae | Determinate paired minutiae | Determinate mated minutiae | Determinate paired minutiae | Used in all steps |
| Determinate skeleton point | Determinate skeleton point | Determinate skeleton point | Determinate skeleton point | Used in all steps |
| Neighbor point | Reference point | Corresponding point candidate | Reference point | Used in all steps |
| | Adjacent skeleton | | Corresponding adjacent skeleton | Used in sub-step 3 |
| Midpoint | | | | Used in sub-step 3-3 |
| Point of interest | Reference point | Corresponding point | Corresponding reference point | |
| Outside check point /SX | Reference point | | Corresponding reference point | Used in sub-step 3-3 |
| Point of interest | | Corresponding point | | |

FIG. 25

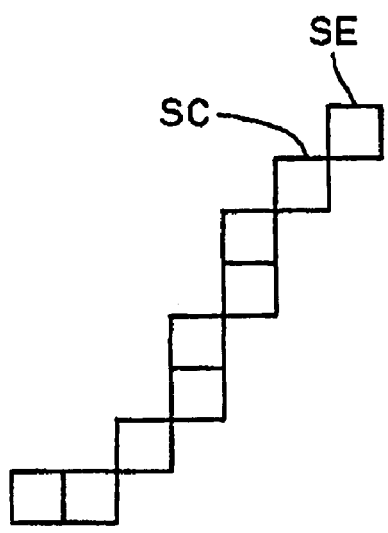
Skeleton of interest
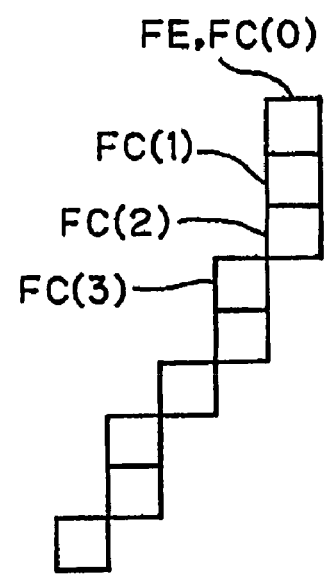
Corresponding skeleton
FIG. 28

METHOD AND APPARATUS FOR MATCHING STREAKED PATTERN IMAGE

BACKGROUND OF THE INVENTION

1. Field of the Invention

The present invention relates to a method and apparatus for matching streaked pattern images such as fingerprint images, and more particularly to a method and apparatus for matching streaked pattern images that can achieve higher accuracy when identifying fingerprints having few ending points and bifurcations.

2. Description of the Related Art

A variety of fingerprint matching methods have been proposed. For example, Japanese Patent Laid-Open Publication No. 59-778 (JP-A-59-778) discloses a matching method that employs the ending points and bifurcations in fingerprint ridges. These ending points and bifurcations are referred to as minutiae.

Japanese Patent Laid-Open Publication No. 2-224076 (JP-A-2-224076) (U.S. Pat. No. 4,947,442) discloses a matching method in which minutiae and non-minutiae are matched. In this matching method, when minutiae are not present in a small region of particular fixed area, the central coordinates of the small region are then used as non-minutiae. In addition, the assignee of the present application has also submitted an application for a method in which the areas of regions that are free of minutiae are used for matching.

U.S. Pat. No. 5,631,971 discloses a method in which matching is realized not only by positional and directional data of minutiae but also by some additional coded data detected by skeleton tracing in the vicinity of minutiae. These additional characteristics increase the information that can be used in matching.

In addition, Tetsuji Kobayashi discloses a method of matching fingerprints by skeletons in "A Fingerprint Verification Method Using Thinned Image Pattern Matching" in Transactions of the Institute of Electronics, Information and Communication Engineers (IEICE), D-II Vol. J79-D-II, No. 3, pp. 330-340 (March 1996). Skeletons are lines obtained by thinning the streaks such as the ridges of fingerprints.

U.S. Pat. No. 4,581,760 discloses a matching method in which image distortions are taken into consideration, the images being matched only for a plurality of partial regions.

Reducing the number of minutiae in a fingerprint that is the object of matching typically complicates matching. For example, the matching method that is disclosed in U.S. Pat. No. 5,631,971 assumes for the purpose of matching that a certain number of minutiae are present and that these minutiae have not been erroneously extracted. Matching is therefore problematic when few minutiae are present.

In addition, latent fingerprints that are to be matched are frequently distorted or have only a small area that can be used for matching, and matching is typically problematic when distortion occurs or when the area that can be used for matching is small. In the matching method described in the above-described paper by Kobayashi, for example, matching is possible when there is almost no distortion in the two fingerprints that are to be matched, but matching becomes difficult if there is distortion. The matching method that is described in U.S. Pat. No. 4,581,760 is difficult to apply when the area of a latent fingerprint is small.

SUMMARY OF THE INVENTION

It is an object of the present invention to provide a streaked pattern image matching method that enables an improvement in matching accuracy even when an image such as a fingerprint includes few minutiae, has been subject to distortion, or has little area that can be used for matching.

It is another object of the present invention to provide a streaked pattern image matching apparatus that enables an improvement in matching accuracy even when the image such as a fingerprint has few minutiae, has been subject to distortion, or has little area that can be used for matching.

The first object of the present invention is achieved by a streaked pattern image matching method for matching a first streaked pattern image and a second streaked pattern image, the method including steps of extracting skeleton pixel data that indicate skeletons, which are lines obtained by thinning each streak of a streaked pattern image, establishing a correspondence between skeleton pixels by specifying pixels among the skeleton pixels of the second streaked pattern image that correspond to skeleton pixels of the first streaked pattern image; and rating the degree of matching between the first streaked pattern image and the second streaked pattern image based on skeleton pixels of the first streaked pattern image that have undergone the process of establishing correspondence.

In the method of the present invention, the degree of matching between the first streaked pattern image and the second streaked pattern image can be rated by, for example, measuring, for each skeleton, the length of continuation of skeleton pixels of the first streaked pattern image that have undergone the process of establishing correspondence and then rating based on the measured length. Alternatively, the degree of this matching can be rated based on, for example, the number of pixels of the pixels of the first streaked pattern image that have a prescribed relation with the skeleton pixels of the first streaked pattern image that have undergone the process of establishing correspondence.

Alternatively, in the method of the present invention, of the minutiae in skeletons, paired minutiae or mated minutiae on the first streaked pattern image side and the second streaked pattern image side that have been placed in correspondence may be specified; and if paired minutiae for which the type on said first streaked pattern image side and on said second streaked pattern image side are identical are present on the skeletons that are the object of the process of establishing correspondence, the pixels of these paired minutiae may be taken as starting points and pixels may be specified from among the skeleton pixels of the second streaked pattern image that correspond to the skeleton pixels of the first streaked pattern image.

In the method of the present invention, pixels from among the skeleton pixels of the second streaked pattern image that correspond to skeleton pixels of the first streaked pattern image are preferably specified based on the positional relation between skeleton pixels or pixels of paired minutiae for which correspondence has already been established and the skeleton pixels of the first streaked pattern image and the skeleton pixels of the second streaked pattern image that are next to undergo the process of establishing correspondence. By means of this constitution, the process of establishing correspondence is carried out based on the positional relation to other paired minutiae rather than on coordinate values, which are easily affected by distortion, and the effect of distortion can therefore be reduced.

The second object of the present invention is achieved by a streaked pattern image matching device for matching a first streaked pattern image and a second streaked pattern image, this device comprising skeleton extraction means for extracting data of skeleton pixels that indicate skeletons, which are lines obtained by thinning the streaks of each of the streaked pattern-images, correspondence means for carrying out a process of establishing correspondence between skeleton pixels by specifying pixels from among the skeleton pixels of the second streaked pattern image that correspond to the skeleton pixels of the first streaked pattern image, and rating means for rating the degree of matching between the first streaked pattern image and the second streaked pattern image based on skeleton pixels of the first streaked pattern image that have undergone the process of establishing correspondence by the correspondence means.

The rating means in the present invention, for example, measures, for each skeleton, the length of continuation of skeleton pixels of the first streaked pattern image that have already undergone the process of establishing correspondence, and then rates the degree of matching based on the measured lengths. Alternatively, the rating means may rate the degree of matching based on, for example, the number of pixels of the pixels of the first streaked pattern image that have a prescribed relation with the skeleton pixels of the first streaked pattern image that have undergone the process of establishing correspondence.

The device of the present invention may be a construction that is provided with minutia matching means for specifying, of the minutiae on skeletons, paired minutiae for which correspondence is established between the first streaked pattern image pixels and second streaked pattern image pixels; wherein when paired minutiae for which the type are the same on the first streaked pattern image side and the second streaked pattern image side are located on a skeleton that is the object of the process of establishing correspondence, the correspondence means may take the pixels of these paired minutiae as starting points and specify pixels from among the skeleton pixels of the second streaked pattern image that correspond to the skeleton pixels of the first streaked pattern image.

In the present invention, the correspondence means preferably specifies pixels from among skeleton pixels of the second streaked pattern image that correspond to skeleton pixels of the first streaked pattern image based on the positional relation between the skeleton pixels or the pixels of paired minutiae that have already been placed in correspondence and the skeleton pixels of the first streaked pattern image and skeleton pixels of the second streaked pattern image that are next to undergo the process of establishing correspondence process. By means of this construction, the correspondence process is performed based on the positional relation between other paired minutiae rather than on coordinate values that are easily influenced by distortion, and therefore allows an alleviation of the influence of distortion.

In addition, the device of the present invention is preferably provided with a skeleton data modification means for modifying skeleton data of one of the streaked pattern images such that the type of the paired minutiae that have been specified by the minutia matching means matches on the first streaked pattern image side and the second streaked pattern image side; and the correspondence means preferably uses the skeleton data that have been modified by the skeleton data modification means to specify those pixels from among the skeleton pixels of the second streaked pattern image that correspond to skeleton pixels of the first streaked pattern image. By means of this construction, matching accuracy can be improved even when the skeleton pixel data have been erroneously extracted.

The skeleton data modification means preferably modifies at least the skeleton data of the second streaked pattern image such that sets of two minutiae that are in an opposing relation are excluded. By means of this construction, skeletons are modified to enable the exclusion of sets of two minutiae that are in an opposing relation, thereby allowing an improvement in the matching accuracy.

The minutia matching means may again specify paired minutiae based on skeleton data that have been modified by the skeleton data modification means.

The device of the present invention may be provided with a base paired minutia determination means for determining, from among paired minutiae that have been specified by the minutia matching means, the base paired minutiae that serve as the reference when determining the order of skeletons that are to undergo the process of establishing correspondence; and the correspondence means may determine the order of the skeletons based on the positional relation between each skeleton and the base paired minutiae and then carry out the process of establishing correspondence for each skeleton according to this order.

The correspondence means may be a construction that, when points on the first streaked pattern image and points on the second streaked pattern image have been designated, determines points that constitute pairs on the first streaked pattern image side and the second streaked pattern image side based on the designated points; and when performing the process of establishing correspondence between skeleton pixels in skeletons that include points that have been determined, takes the determined points as starting points and specifies those pixels from among the skeleton pixels of the second streaked pattern image that correspond to skeleton pixels of the first streaked pattern image. This construction enables an improvement in the accuracy of establishing correspondence between skeleton pixels.

According to the present invention, skeleton pixel data are extracted that indicate skeletons, which are lines obtained by thinning the streaks of each streaked pattern image; a process of establishing correspondence between skeleton pixels is performed by specifying those pixels from among the skeleton pixels of the second streaked pattern image that correspond to skeleton pixels of the first streaked pattern image; and the degree of matching between the first streaked pattern image and the second streaked pattern image is rated based on the skeleton pixels of the first streaked pattern image that have undergone the process of establishing correspondence. The correlation between skeleton pixels is therefore clear even when the number of paired minutiae is limited, and matching can thus be achieved between streaked pattern images. As a result, matching is enabled even when the area of the streaked pattern images is small.

The above and other objects, features, and advantages of the present invention will become apparent from the following description with reference to the accompanying drawings, which illustrate examples of the present invention.

BRIEF DESCRIPTION OF THE DRAWINGS

FIGS. 5A to 5D show mask patterns that show the vicinities of the pixels of skeleton points;

FIGS. 6A and 6B show examples of the modification of the mask patterns;

FIGS. 7A and 7B are explanatory views of Code 8;

FIG. 8 shows an example of the representation of skeleton data;

FIGS. 12A and 12B are diagrams showing exemplary paired minutiae which are in an opposing relationship;

FIG. 14 is a table showing rules which define the specifics of modifications that can be made to the F-side skeleton data;

FIGS. 16A and 16B are diagrams for describing the processing for modifying an F-side paired minutia of interest;

FIGS. 17A and 17B are diagrams for describing the processing for modifying an F-side paired minutia of interest;

FIG. 20 is a table showing an exemplary skeleton point correspondence list;

FIG. 25 is a table showing a correspondence of terms used for S-side (search-side) data to terms used for F-side (file-side) data;

FIG. 28 is a diagram illustrating examples of points of interest and corresponding point candidates;

DETAILED DESCRIPTION OF THE PREFERRED EMBODIMENTS

Figure 1:
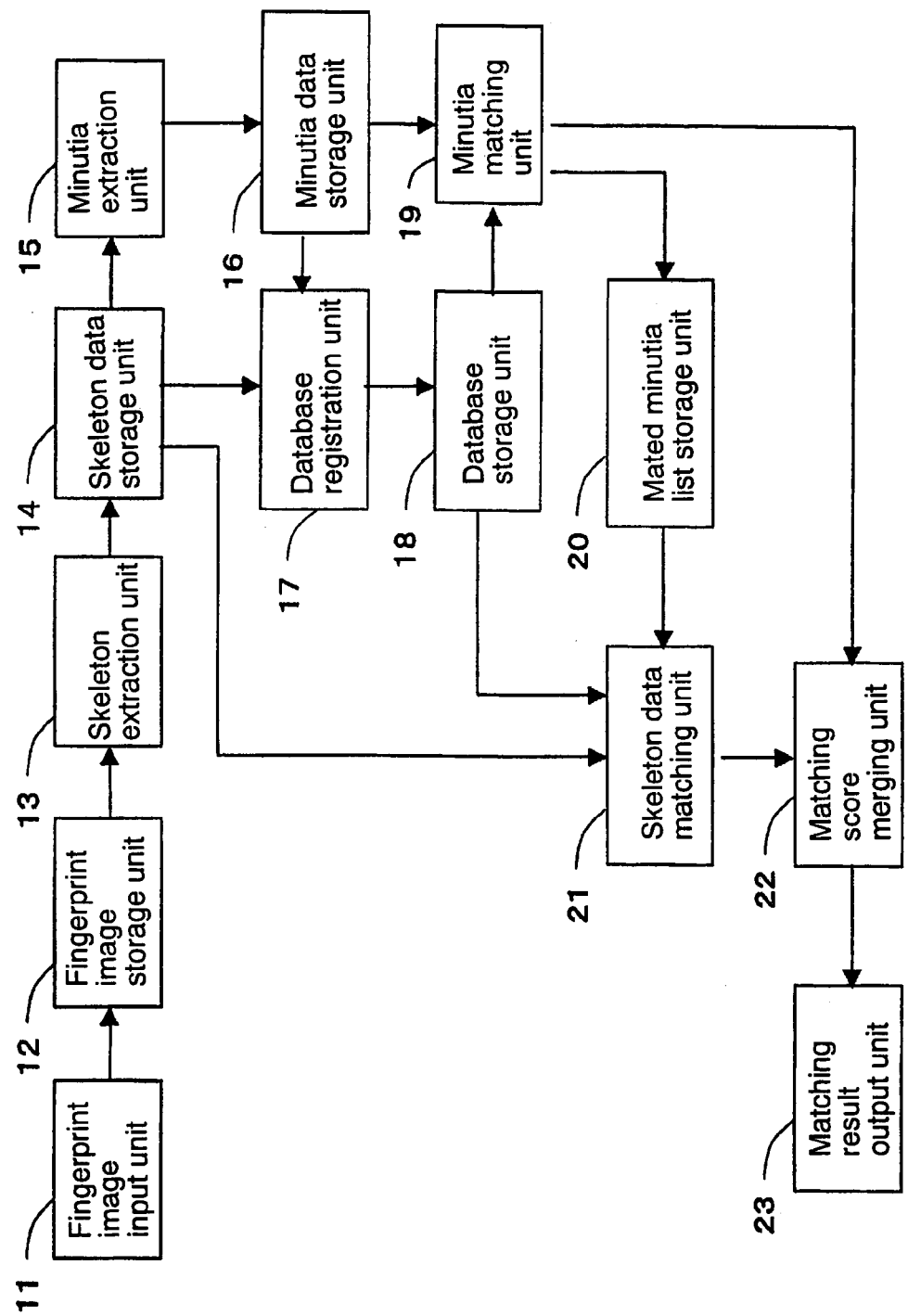
FIG. 1 is a block diagram showing the construction of a streaked pattern image matching device of the first embodiment of the present invention that is constituted as a fingerprint matching device.

FIG. 1 shows the construction of the streaked pattern image matching device of the first embodiment of the present invention.

In the following explanation, the streaked pattern image matching device is described for a case in which fingerprints are taken as the object of matching, and this streaked pattern image matching device is therefore referred to as a fingerprint matching device. The fingerprint matching device of the present embodiment is provided with: fingerprint image input unit 11, fingerprint image storage unit 12, skeleton extraction unit 13, skeleton data storage unit 14, minutia extraction unit 15, minutia data storage unit 16, database registration unit 17, database storage unit 18, minutia matching unit 19, paired minutia list storage unit 20, skeleton data matching unit 21, matching score merging unit 22, and matching result output unit 23.

Fingerprint image input unit 11 digitizes and receives a fingerprint image that has been read by a fingerprint sensor or scanner. Fingerprint image storage unit 12 temporarily stores fingerprint images that have been received from fingerprint image input unit 11. Skeleton extraction unit 13 subjects fingerprint images that are stored by fingerprint image storage unit 12 to a binarization process and thinning process to extract skeleton data. Skeleton data storage unit 14 temporarily stores skeleton data that have been extracted by skeleton extraction unit 13. Minutia extraction unit 15 extracts data of minutiae from the skeleton data that are stored by skeleton data storage unit 14. Minutia data storage unit 16 stores the minutia data that have been extracted by the minutia extraction unit 15.

Database storage unit 18 stores skeleton data or minutia data. Rather than temporarily storing data, database storage unit 18 continues to save data until receiving instructions to delete the data. The various types of data that are stored in database storage unit 18 are used for matching inquiry fingerprint images when these inquiry fingerprint images are newly entered into the fingerprint matching device. In the following explanation, the various types of data that are stored in database storage unit 18 are referred to as "File-side" or "F-side," while the various types of data that are extracted from inquiry fingerprint images are referred to as "Search side" or "S-side" to distinguish the two.

Database registration unit 17 registers skeleton data that are stored in skeleton data storage unit 14 or minutia data that are stored in minutia data storage unit 16 in database storage unit 18. Minutia matching unit 19 reads from minutia data storage unit 16 the S-side minutia data that have been extracted from a fingerprint image that has been entered as inquiry input, compares and matches the data with F-side minutia data that are registered in database storage unit 18, and calculates the degree of similarity, i.e., a matching score of the minutiae. A set composed of a Search-side minutiae and File-side minutiae for which a one-to-one correspondence has been established by minutia matching unit 19 is referred to as paired minutiae. Paired minutia list storage unit 20 stores a paired minutia list that has been calculated by minutia matching means 19. The paired minutia list is a collection of information on paired minutiae that have been placed in correspondence on the Search-side and the File-side.

Skeleton data matching unit 21 uses Search-side skeleton data that are stored in skeleton data storage unit 14, File-side skeleton data that are stored in database storage unit 18, and the paired minutia list that is stored in paired minutia list storage unit 20 to compare and match Search-side skeletons and File-side skeletons, and calculates the degree of matching of the skeletons, i.e., a matching score of the skeletons. Matching score merging unit 22 uses the matching scores of the minutiae that have been calculated by minutia matching unit 19 and the matching scores of a skeleton calculated by skeleton data matching unit 21 to calculate the degree of similarity that takes into consideration both the minutiae and skeletons. Matching result output unit 23 supplies the results of calculation of matching score merging unit 22.

Figure 2:
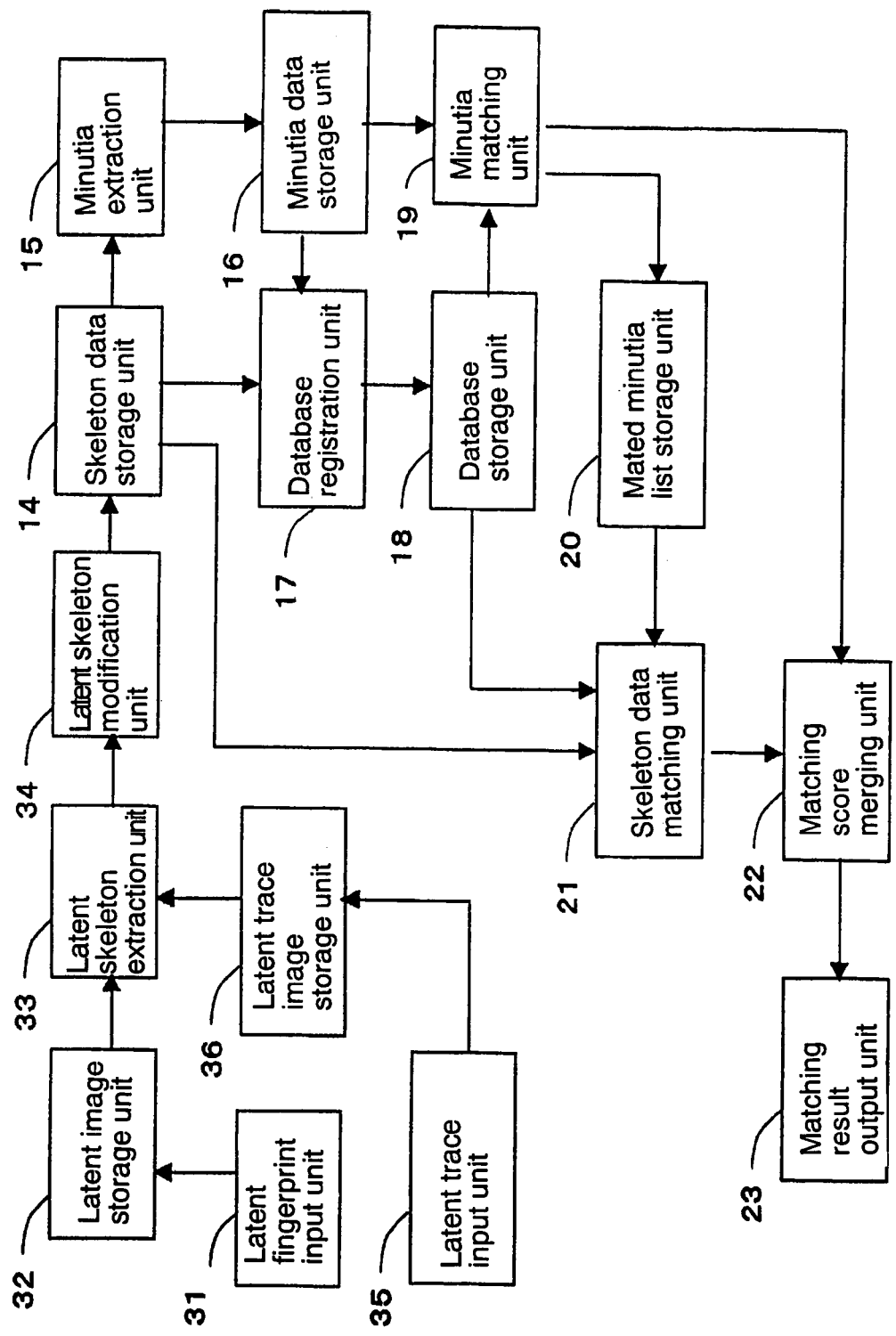
FIG. 2 is a block diagram showing another example of the construction of a fingerprint matching device.

The fingerprint matching device according to this embodiment may also allow an examiner to modify fingerprint images that have been entered as input. FIG. 2 is a block diagram showing an example of the construction of a fingerprint matching device for a case that assumes modification of data by an examiner. Constituent elements in FIG. 2 that are identical to constituent elements in FIG. 1 are identified by the same reference numerals and redundant explanation is omitted.

The fingerprint matching device that is shown in FIG. 2 is provided with: latent fingerprint input unit 31, latent image storage unit 32, latent skeleton extraction unit 33, latent skeleton modification unit 34, latent trace input unit 35, latent trace image storage unit 36, skeleton data storage unit 14, minutia extraction unit 15, minutia data storage unit 16, database registration unit 17, database storage unit 18, minutia matching unit 19, paired minutia list storage unit 20, skeleton data matching unit 21, matching score merging unit 22, and matching result output unit 23.

Latent fingerprint input unit 31 digitizes and receives latent fingerprint images that have been read by a fingerprint sensor or scanner. Latent image storage unit 32 temporarily stores fingerprint images that have been received as input from latent fingerprint input unit 31. In addition, latent trace input unit 35 also digitizes and receives information on latent fingerprint tracing paper that has been read by a scanner. Latent trace image storage unit 36 temporarily stores the latent fingerprint images that have been received as input from latent trace input unit 35. Latent skeleton extraction unit 33 subjects the fingerprint images that are stored in latent image storage unit 32 or latent trace image storage unit 36 to a binarization process and thinning process to extract skeleton data. Latent skeleton modification unit 34 assists the examiner's job of modifying skeleton data that have been extracted by latent skeleton extraction unit 33.

Explanation next regards the operation of the fingerprint matching device in the present embodiment.

Figure 3B:
FIGS. 3A and 3B show examples of fingerprint images that have been digitized.
Figure 3A:

In the fingerprint matching device that is shown in FIG. 1, fingerprint image input unit 11 digitizes a fingerprint image that has been read by a fingerprint sensor or scanner and temporarily stores the result in fingerprint image storage unit 12. FIG. 3A shows an example of such a digitized fingerprint image. FIG. 3A is an example of a fingerprint image that has been digitized at a resolution of 500 dpi (dots per inch) in accordance with the standards of the ANSI/NIST-CSL-1-1993 Data Format for the Interchange of Fingerprint, Facial, and SMT Information as established by the National Institute of Standards and Technology in the United States. In the following explanation, examples of fingerprint images have been digitized in this way.

Figure 4B:
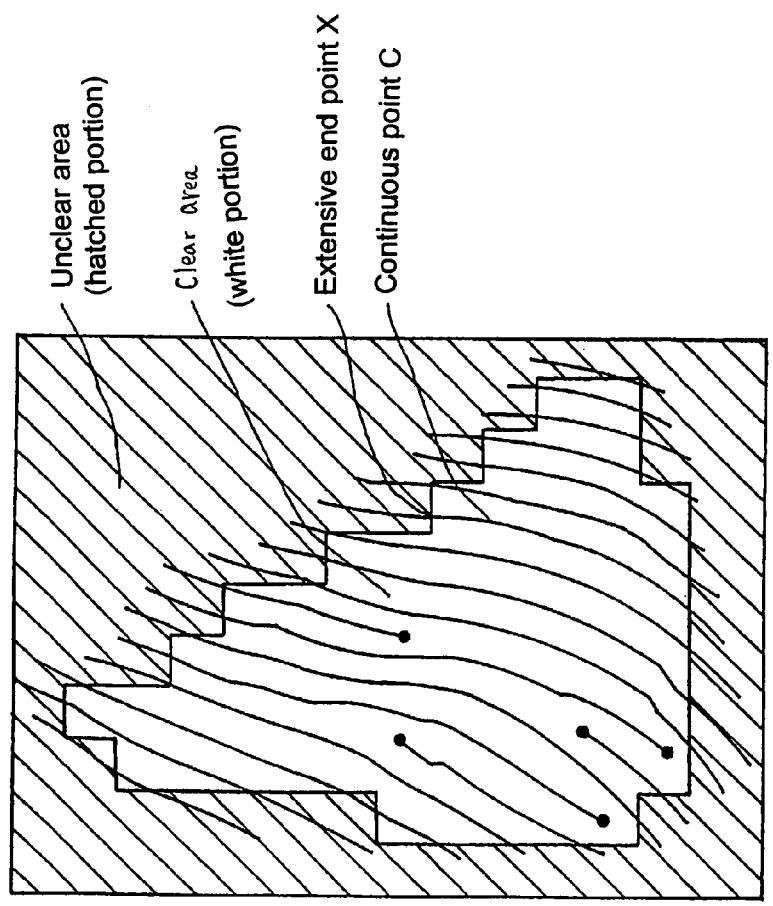
FIGS. 4A and 4B show examples of skeleton data that have been extracted from fingerprint images.
Figure 4A:
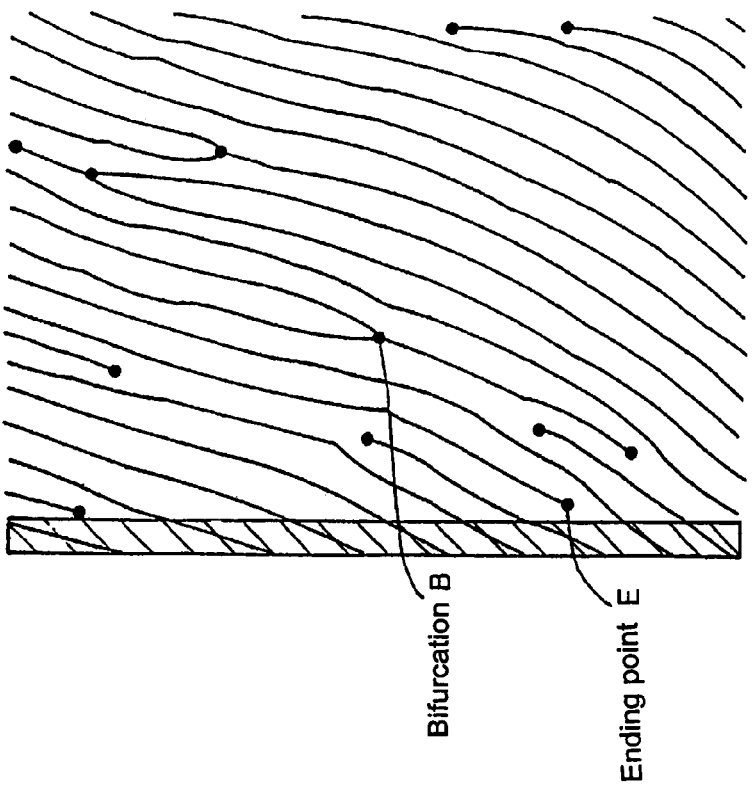

Skeleton extraction unit 13 subjects the digitized fingerprint image to a binarization process followed by a thinning process to extract skeleton data and then temporarily stores the result in skeleton data storage unit 14. The binarization and thinning processes can be realized by a known technique such as the method disclosed in, for example, Japanese Patent Publication No. 60012674 (JP-B-60-12674) corresponding to U.S. Pat. No. 4,310,827. FIG. 4A shows an example of skeleton data that have been extracted from the fingerprint image that is shown in FIG. 3A. The skeleton data that are shown in FIG. 4A indicate whether the reliability of the data is high or low for each rectangular area of 16 pixels×16 pixels. These rectangular areas of 16×16 pixels are referred to as "zone regions" or simply as "zones." In FIG. 4A, areas having zones in which data reliability is low, i.e., unclear areas, are indicated by diagonal shading. The skeletons are each represented by black pixels that are continuously aligned in a vertical, horizontal, or diagonal direction, and in FIGS. 4A and 4B, are shown as smooth curved lines. Skeletons shown in subsequent figures are represented in the same way.

In the fingerprint matching device shown in FIG. 2, latent fingerprint input unit 31 digitizes a latent fingerprint image that has been read by a scanner and temporarily stores the result in latent image storage unit 32. FIG. 3B shows an example of such a digitized fingerprint image. As with FIG. 3A, FIG. 3B shows an example of an image of a latent fingerprint that has been digitized at a resolution of 500 dpi.

Particularly in the case of latent fingerprints of low quality, the fingerprint is traced beforehand onto tracing paper that has been enlarged approximately five times by an examiner. Latent trace input unit 35 scans information that has been traced onto this tracing paper, i.e., a latent trace image, digitizes the image, and temporarily stores the result in latent trace image storage unit 36.

As with skeleton extraction unit 13 in the device that is shown in FIG. 1, latent skeleton extraction unit 33 subjects the digitized latent fingerprint image or latent trace image to a binarization process followed by a thinning process to extract skeleton data and temporarily stores the data in latent skeleton modification unit 34. FIG. 4B shows an example of skeleton data that have been extracted from the fingerprint image shown in FIG. 3B.

A latent fingerprint image is typically of poor quality, and the range of a skeleton that can be automatically extracted is therefore limited. Latent skeleton modification unit 34 assists the examiner's task of modifying the skeleton data of, for example, a latent fingerprint image. This modification method is realized by a known technique such as the technique disclosed in Japanese Patent Laid-Open Publication No. 2002-074381 (JP, P2002-74381A). After carrying out a modification, latent skeleton modification unit 34 stores the skeleton data in skeleton data storage unit 14.

The operations following the storage of skeleton data by skeleton data storage unit 14 are identical in the device shown in FIG. 1 and the device shown in FIG. 2. Minutia extraction unit 15 reads skeleton data from skeleton data storage unit 14 and extracts data of minutiae (i.e., ending points and bifurcations) from these skeleton data. This minutia extraction process can be realized by a known technique such as the technique disclosed in, for example, Japanese Patent Publication No. 60-012674 (JP-B-60-12674). However, minutia data are not extracted from unclear areas.

When the skeleton data that have been extracted by skeleton extraction unit 13 are data that are to be registered as File-side skeleton data, database registration unit 17 reads these skeleton data from skeleton data storage unit 14 and registers the skeleton data in database storage unit 18. When the minutia data that have been extracted by minutia extraction unit 15 are data that are to be registered as File-side minutia data, database registration unit 17 reads the minutia data from minutia data storage unit 16 and registers the minutia data in database storage unit 18. When the minutia data that have been extracted by minutia extraction unit 15 are Search-side minutia data, minutia matching unit 19 reads these minutia data from minutia data storage unit 16.

Minutia matching unit 19 matches Search-side minutia data with File-side minutia data that are stored in advance by database storage unit 18. More specifically, minutia matching unit 19 establishes correspondences between minutiae that are to make up pairs, produces a paired minutia list that shows the correlation between S-side minutiae and F-side minutiae, and further, calculates matching scores of the minutiae. This matching process can be realized by a known technique such as the method described in, for example, Japanese Patent Laid-Open Publication No. 59-778 (JP-A-59-778) corresponding to U.S. Pat. No. 4,646,352. Minutia matching unit 19 stores the created paired minutia list in paired minutia list storage unit 20.

Skeleton data matching unit 21 compares and matches Search-side skeleton data and File-side skeleton data and calculates skeleton matching scores. Explanation will first be given regarding the prerequisite conditions and object data for the skeleton data matching process by skeleton data matching unit 21.

The skeleton data matching process first requires that at least three sets of paired minutiae are included in the paired minutia list. If only two or fewer sets of paired minutiae are included in the paired minutia list that is stored in paired minutia list storage unit 20, skeleton data matching unit 21 halts the skeleton data matching process.

The present embodiment takes as the object of processing skeleton data that are defined by links to eight adjacent positions. These skeleton data represent the pixels for each point that is located on a skeleton (hereinbelow referred to as a "skeleton point") as black pixels, the type of the point being distinguished according to the states of the eight pixels that are adjacent to the pixel of the skeleton point. FIG. 5A shows a mask pattern that represents the pixel of the skeleton point and the eight adjacent positions of the skeleton point. In the mask pattern that is shown in FIG. 5A, pixels that are black pixels are indicated by "1" and white pixels are represented by "0." In other words, if n=0 to 8, a pixel for which Xn=1 is a black pixel, which is a skeleton point; and a pixel for which Xn=0 is a pixel other than a skeleton point. In addition, there cannot be four or more black pixels in the eight adjacent points (X1 to X8) of skeleton point X0. In other words, the sum of the values of pixels X1 to X8 is "3" or less. Further, in these data, there cannot be two adjacent black pixels among the eight adjacent pixels of a particular black pixel. For example, the values of X1 and X2 cannot both be "1" (black pixels).

Skeleton points that are represented by this mask pattern can be divided among four types of points: ending points, bifurcations, continuation points, and extensive end points. Ending points (hereinbelow represented by "E") are skeleton points having only one black pixel among the eight adjacent pixels, as shown in FIG. 5B. Bifurcations (hereinbelow represented by "B") are skeleton points having three black pixels among the eight adjacent pixels, a white pixel always being present between any two black pixels of these three black pixels, as shown in FIG. 5C. Continuation points (hereinbelow represented by "C") are skeleton points having two black pixels among the eight adjacent pixels, white pixels being present between these two black pixels, as shown in FIG. 5D. Finally, an extensive end point (hereinbelow represented by "X") is a continuation point to which the skeleton is believed to actually extend. Of these points, ending points E and bifurcations B are minutiae. Continuation points C account for all skeleton points that are neither minutiae nor extensive end points X.

The incidence of intersections of fingerprint ridges is extremely rare. When extracting skeleton data, mask patterns that indicate the intersection of skeleton are eliminated. For example, when a mask pattern occurs such as the one shown on the left side of FIG. 6A, skeleton extraction unit 13 modifies this mask pattern to a mask pattern that is shown in the center or the right side of FIG. 6A. In other words, the intersection point is modified to two bifurcations B. As shown in FIG. 6B, a case in which X1, X3, X5, and X7 are all "1" cannot be modified to two bifurcations and is therefore eliminated as being outside the scope of matching. In other words, a zone region that includes the intersection point shown in FIG. 6B is considered to be an unclear area.

Figures 7A, 7B:
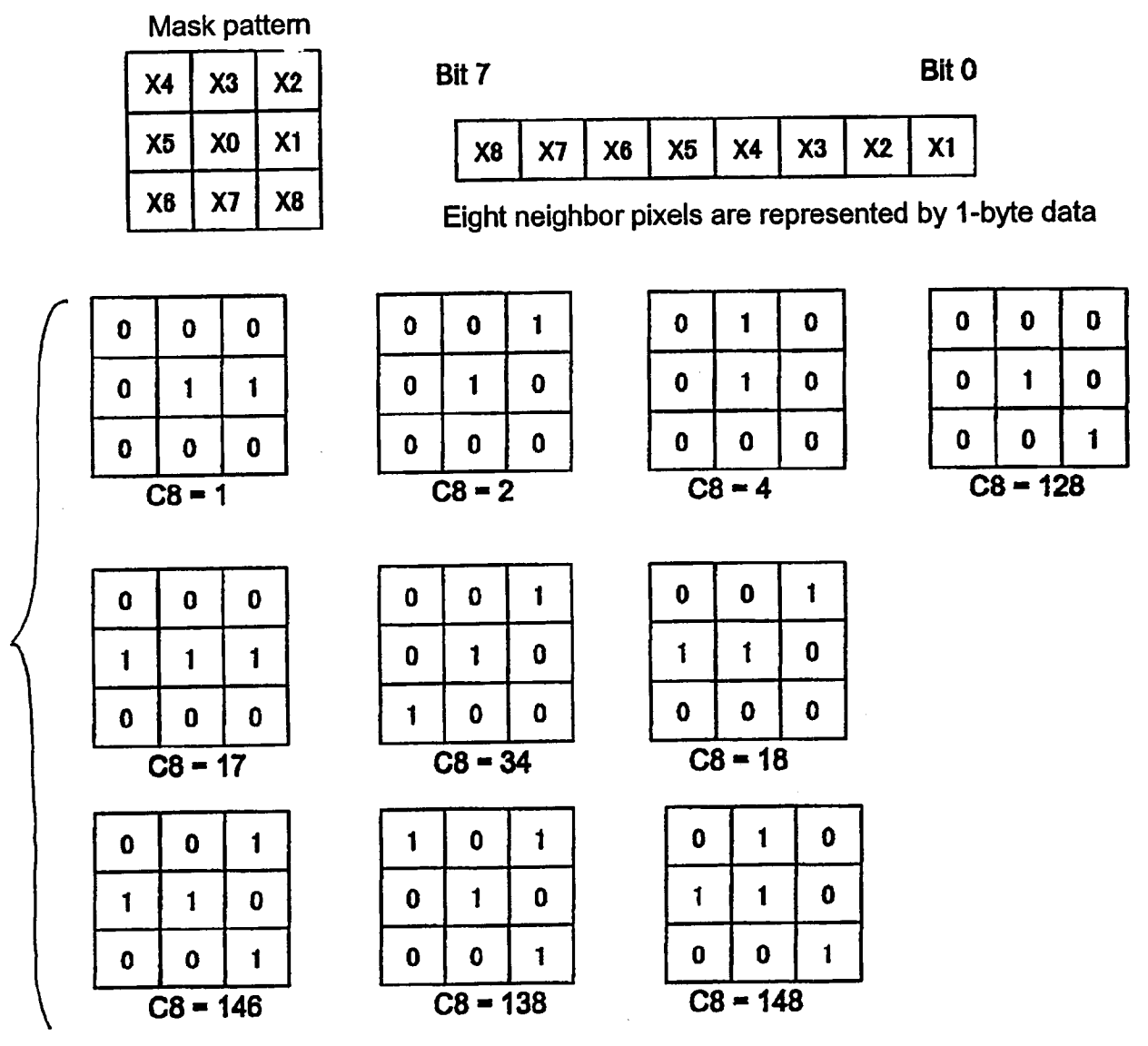

A ridge that actually extends but that, as the result of an inadequate impression, appears to be an ending point is termed a "fringe of impression." Zone regions that include fringes of impression or pixels for which, similar to fringes of impression, the skeleton structure cannot be discerned beyond a particular point are determined to be unclear areas by skeleton extraction unit 13. An extensive end point X is defined to be "a skeleton point immediately preceding extension into an unclear region." The states of the eight adjacent points to each pixel are indicated by one byte of data. In other words, the sequential arrangement of the values of a mask pattern that takes X1 as the zero-th bit and that continues to X8 is represented by one byte of data. FIG. 7A shows an example of one byte of data that is expressed in this way. The data of the eight adjacent points that are represented by one byte of data are referred to as "Code 8" or "C8." FIG. 7B shows an example of C8. For example, if only X1 of the eight adjacent points is "1," C8 is "00000001" and the value of C8 is therefore "1."

FIG. 8 is an explanatory view showing an example of the expression of skeleton data. Skeleton data are expressed as a collection of skeleton units. A skeleton unit is the minimum unit of a skeleton that takes ending points E, bifurcations B, or extensive end points X as starting points and end points. For example, skeleton unit 1 shown in FIG. 8 is a skeleton unit in which extensive end point X is taken as a starting point and end point B is taken as an endpoint, with continuous points C present between these two points. X and Y that appear in FIG. 8 represent the coordinates of the pixels of each skeleton point. Further, as shown in FIG. 8, the type, the coordinates, and the code 8 of skeleton points are placed in correspondence for each pixel.

Figure 9:
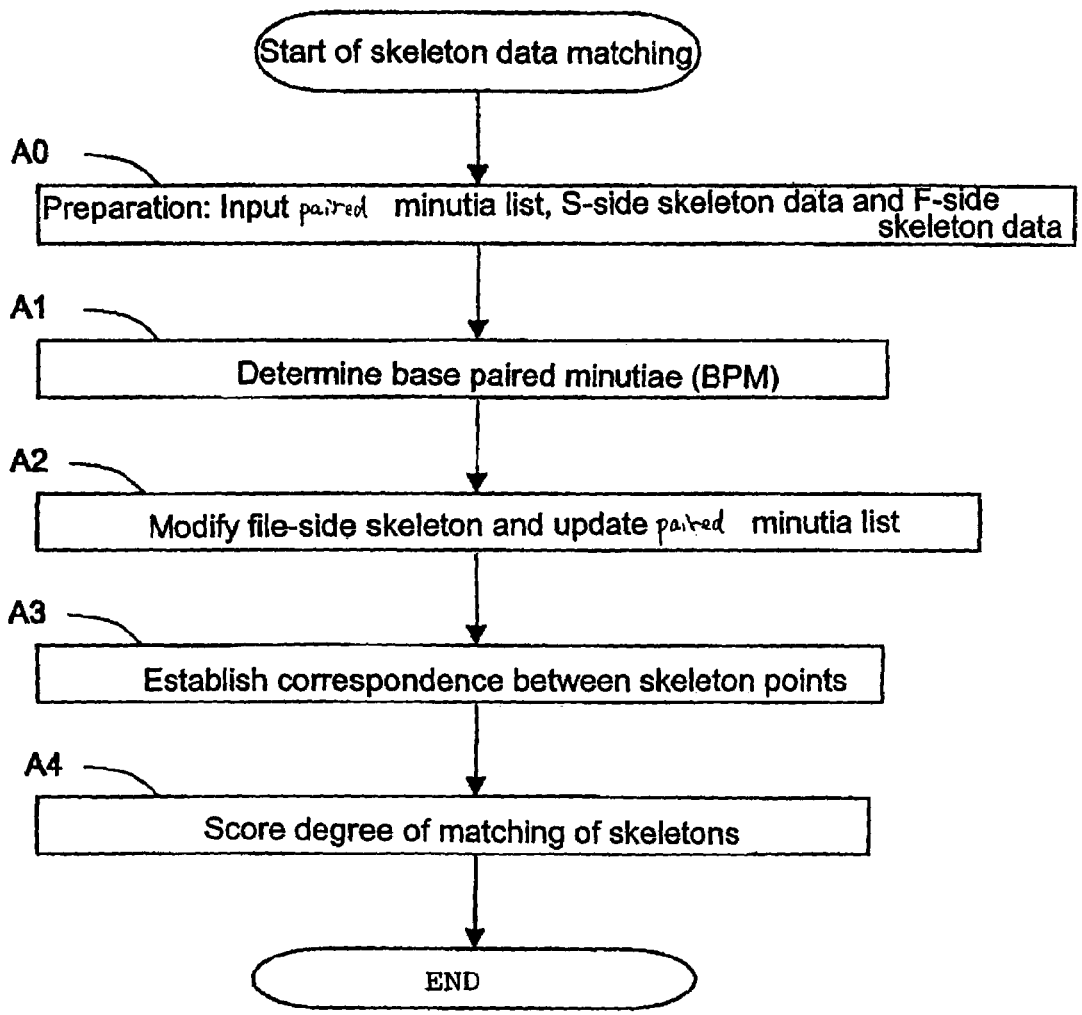
FIG. 9 is a flow chart showing the outline of the skeleton data matching process.

We next refer to FIG. 9 to present an outline of the skeleton data matching process. In Step A0, skeleton data matching unit 21 first reads the paired minutia list, S-side skeleton data, and F-side skeleton data and then allocates these data in the internal memory that is used by skeleton data matching unit 21. Skeleton data matching unit 21 also reserves necessary memory regions (for example, memory regions that are used as work tables). Step A0 is the preparatory step of the skeleton data matching process.

Skeleton data matching unit 21 further reads the paired minutia list that was produced by minutia matching unit 19 from paired minutia list storage unit 20. In this paired minutia list, the type of a S-side paired minutia and an F-side paired minutia that form a pair do not necessarily match. In the following explanation, determinate paired minutiae are defined to be pairs in which the S-side type and the F-side type are identical. Typically, the term "determinate paired minutiae" can be considered to have the same meaning as "paired minutiae," and in some cases, the term "determinate paired minutiae" may be used even when the types are not identical. In the following explanation, however, paired minutiae for which the types are also identical will be called "determinate paired minutiae."

In Steps A1 to A4 that are described below, when selecting appropriate data from a plurality of data items, a numerical value that indicates the degree of inappropriateness is assigned for each of the data items. This numerical value is referred to as a "penalty."

After Step A0, skeleton data matching unit 21 determines base paired minutiae (hereinbelow abbreviated as "BPM") in Step A1. BPM are paired minutiae that serve as a criteria for determining the order of selection when selecting each skeleton point or unit.

After Step A1, skeleton data matching unit 21 modifies the File-side skeleton data in Step A2 such that the type of each of the individual paired minutiae matches on the Search-side and File-side. At the same time, skeleton data matching unit 21 also modifies the type information of File-side minutiae that is included in the paired minutia list. Skeleton data matching unit 21 also keeps a count of the penalties that correspond to the degree of modification of the skeleton data. If there are paired minutiae in which divergence occurs that is too great to allow modification of the File-side data, skeleton data matching unit 21 deletes these paired minutiae from the paired minutia list. In addition, as will be explained hereinbelow, in some cases, a plurality of types of skeleton data may be produced as F-side skeleton data in Step A1. In such cases, the data having the lesser degree of modification based on the penalty is selected in Step A2.

Additionally, in some cases, minutiae that do not form a pair on the S-side and F-side will result in skeleton states such as "whiskers" or "disconnections." Skeleton data matching unit 21 modifies the skeleton data such that these skeleton states are eliminated.

Skeleton data matching unit 21 next determines for each skeleton point on the Search-side whether or not a corresponding skeleton point exists on the File-side. If a corresponding skeleton point exists, skeleton data matching unit 21 places the Search-side skeleton point and File-side skeleton point in correspondence in Step A3. As a result of Step A3, correspondences are established not only for minutiae but for continuation points C and extensive end points X as well. The set of information on paired skeleton points that have been placed in correspondence on the Search-side and File-side are recorded in the skeleton point correspondence list.

Skeleton data matching unit 21 next measures the length of continuation of skeleton points that have been placed in correspondence, i.e., the skeleton distance. Skeleton data matching unit 21 measures the skeleton distance for skeletons that have been placed in correspondence on the S-side and F-side (hereinbelow referred to as "determinate skeletons") and finds the total sum. A matching score for the skeleton is then calculated based on the total sum and the penalties that have been counted in Step A1 to Step A3. The unit of distance is the distance of one pixel that is adjacent in the vertical or horizontal direction. The distance to a pixel that is adjacent in a diagonal direction is therefore approximately 1.4 pixels ($\sqrt{2}$ pixels).

Next, detailed description will be given on each of steps A1 to A4 in the skeleton data matching processing.

Figure 10:
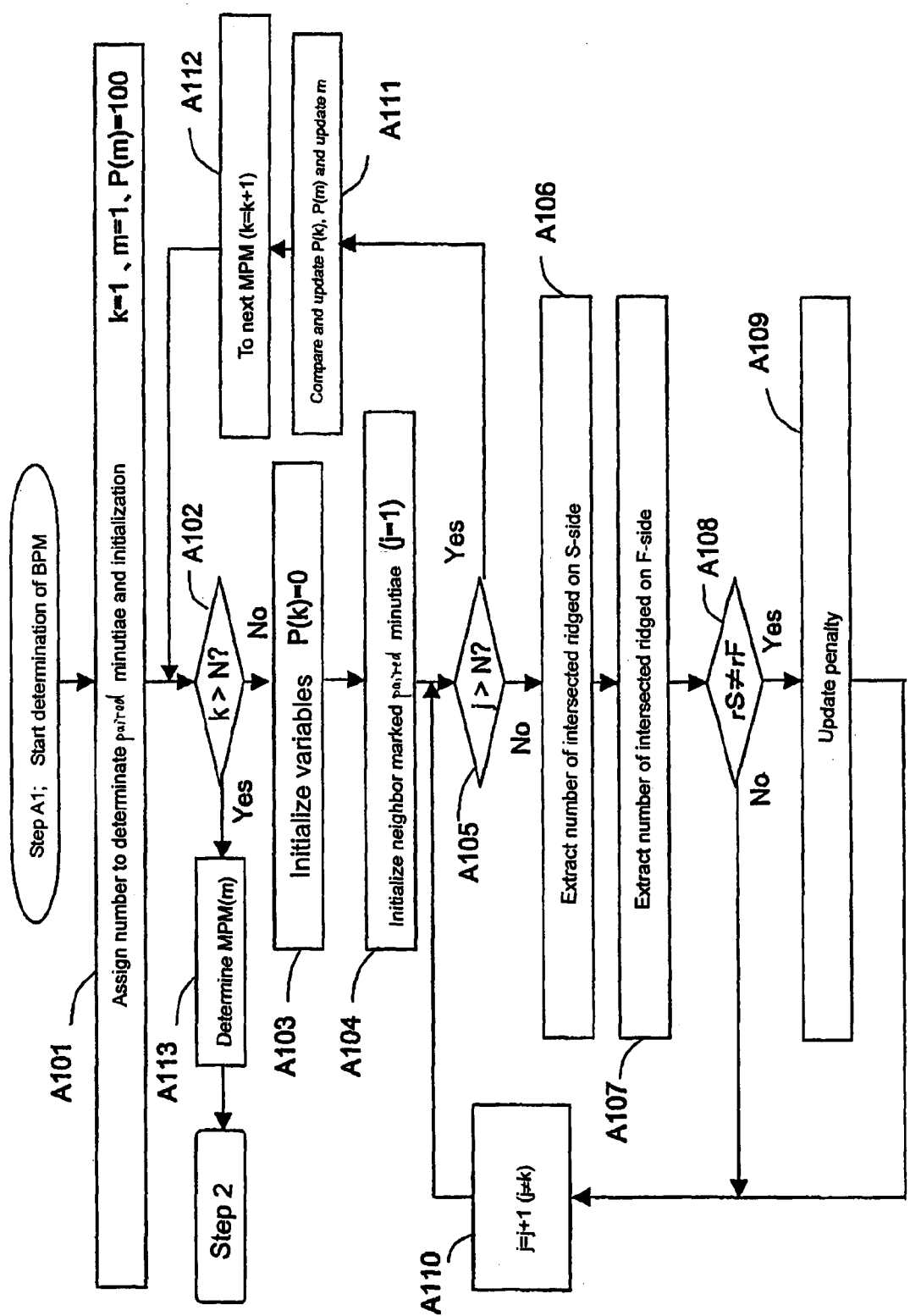
FIG. 10 is a flow chart illustrating a routine for determining BPM.

FIG. 10 illustrates the flow of the processing at step A1 (for determining BPM). Skeleton data matching unit 21 determines BPM in the following manner, wherein important criteria for determination is that the paired minutiae are identical in type. Specifically, at step A101, skeleton data matching unit 21 retrieves all determinate paired minutiae from paired minutiae and assigns numbers to the retrieved determinate paired minutiae. A determinate paired minutia assigned a number is referred to as the "marked paired minutia" and is represented by MPM(n), where "n" is a number assigned to the paired minutia. Assume that a maximum value for the assigned number is N. Skeleton data matching unit 21 also sets an initial value k=1, where $\underline{k}$ is a variable for orderly selecting marked paired minutiae one by one from all MPM(n), and a selected marked paired minutia (i.e., marked paired minutia of interest) is represented by MPM(k). $\underline{k}$ is incremented by one after one marked paired minutia is selected. Skeleton data matching unit 21 also sets initial values m=1 and P(m)=100, where $\underline{m}$ is a variable for identifying a marked paired minutia that has the smallest penalty. While the initial value for P(m) is herein set to 100, the initial value for P(m) may be any value as long as it is sufficiently larger than P(k). A selected paired minutia is represented by the term "of interest."

After step A101, skeleton data matching unit 21 determines at step A102 whether or not all MPM(n) have been selected. If k>N is satisfied, skeleton data matching unit 21 determines that all MPM(n) have been selected, followed by a transition of the processing to step A113. If k>N is not satisfied, skeleton data matching unit 21 sets an initial value P(k)=0 at step A103, where P(k) is a penalty corresponding to a marked paired minutia of interest MPM(k).

Subsequently, skeleton data matching unit 21 sets an initial value j=1 at step A104, where $\underline{j}$ is a variable for orderly selecting marked paired minutiae near MPM(k) one by one. A selected adjacent marked minutia, i.e., a adjacent paired minutia of interest is represented by MPM(j). When k=1, the initial value for $\underline{j}$ is set to two. The initial value for $\underline{j}$ set to two can prevent MPM(k) and MPM(j) from resulting in the same paired minutia.

After step A104, skeleton data matching unit 21 determines at step A105 whether or not it has selected each of adjacent marked paired minutiae. Skeleton data matching unit 21 so determines when j>N is satisfied, followed by a transition to step A111, later described. If J>N is not satisfied, skeleton data matching unit 21 finds a number rS of ridge lines which are intersected with a line segment that connects marked paired minutia MPM(k) of interest to marked adjacent paired minutia MPM(j), i.e., a line segment on the search side, based on search side skeleton data. At step A107, skeleton data matching unit 21 similarly finds a number rF of ridge lines which are intersected with a line segment that connects marked paired minutia of interest MPM(k) to adjacent paired minutia of interest MPM(j), i.e., a line segment on the file side based on file side skeleton data.

After step A107, skeleton data matching unit 21 determines at step A108 whether or not there is a difference between the numbers rS and rF of ridge lines which are intersected with the respective line segments. If rS=rF, the value of $\underline{j}$ is incremented by one at step A110. However, if j=k, the value of $\underline{j}$ is again incremented by one.

If rS≠rF, i.e., if there is a difference between the numbers rS and rF of ridge lines which are intersected with the respective line segments at step 108, skeleton matching unit 21 calculates a penalty in accordance with adjacent paired minutia of interest MPM(j), and adds the penalty to P(k) at step A109. Penalty P in accordance with adjacent paired minutia of interest MPM(j) is calculated by the following equation:

$$P=|rS-rF|/\max(\min(rS, rF), 1)$$

where max and min are functions for specifying a maximum and a minimum for the values in the parenthesis, respectively. After updating P(k), skeleton data matching unit 21 performs the processing at step A110 (incrementing j), and repeats the operation at step A105 onward.

On the other hand, upon determining at step A105 that it has selected each adjacent marked paired minutia, skeleton data matching unit 21 compares a minimum value P(m) for the penalties so far calculated with penalty P(k) for marked paired minutia of interest MPM(k) at step A111. If P(k)<P(m), skeleton data matching unit 21 updates P(m) with the value of P(k), and updates $\underline{m}$ with the value of $\underline{k}$. If P(k)=P(m), skeleton data matching unit 21 determines which of MPM(m) specified by m and marked paired minutia of interest MPM(k) is closer to barycenter coordinates of an S-side paired minutia group. If MPM(k) is closer, P(m) and $\underline{m}$ are updated with the values of P(k) and $\underline{k}$, respectively. If P(k)>P(m), no updates are made.

After step A111, skeleton data matching unit 21 increments the value of $\underline{k}$ by one to select the next marked paired minutia at step A112, followed by the processing returning to step A102. If k>N is determined at subsequent step A102, this means that skeleton data matching unit 21 has selected all marked paired minutiae. The value $\underline{m}$ at this time identifies the marked paired minutia that has the smallest penalty. Therefore, skeleton data matching unit 21 determines MPM(m) identified by this value of $\underline{m}$ as the BPM at step A113.

The BPM determination processing illustrated in FIG. 10 cannot be applied when no determinate paired minutia exists in paired minutiae. Therefore, in such a case, the BPM is determined by exceptional processing shown below. When all paired minutiae differ in type between the S-side and F-side, the paired minutia nearest to the barycenter coordinates of the S-side paired minutia group is selected as a BPM candidate. Since the BPM candidate on the S-side differs in type from the BPM candidate on the F-side, the processing should be performed in accordance with the type.

Figure 11:
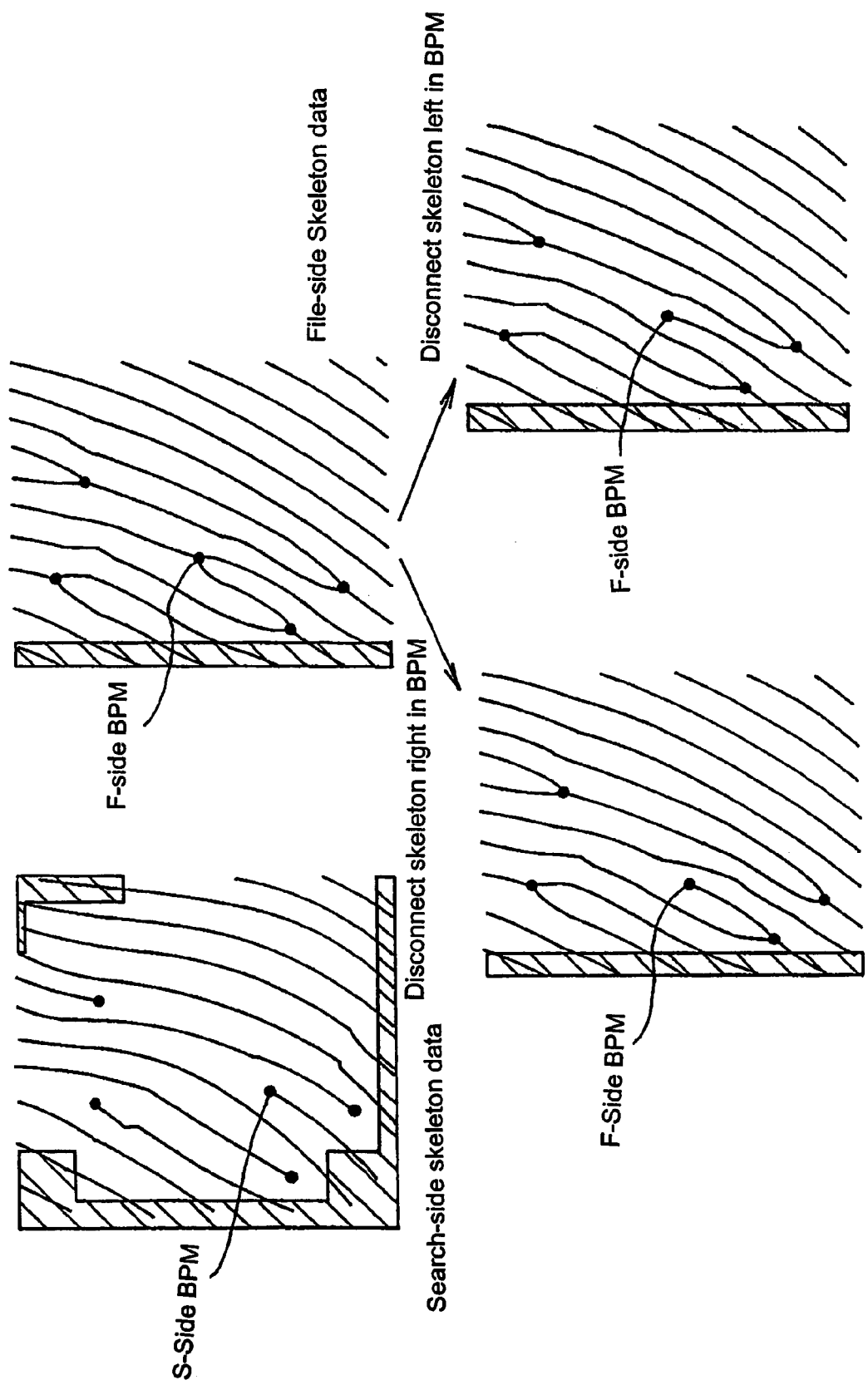
FIG. 11 is a diagram illustrating the processing for changing a bifurcation point to an ending point.

When the type of an S-side paired minutia, which is a BPM candidate, is ending point E, and the type of an F-side paired minutia is bifurcation point B, F-side bifurcation point B is changed to ending point E. Then, this ending point E is paired with S-side ending point E to form the BPM. FIG. 11 describes the processing for changing an F-side bifurcation point, i.e., a bifurcation point which is selected to be a BPM candidate, to an ending point. As illustrated in FIG. 11, two types of skeleton data and two types of paired minutia lists can be created depending on which to separate a skeleton that branches into the left and right directions. Skeleton data matching unit 21 creates and holds the two types of skeleton data. In any of the two types of skeleton data, ending points are determined as the BPM. When a minutia direction is chosen in the positive Y-axis direction, the right is defined in the positive X-axis direction, and the left is defined in the negative X-axis direction. As previously mentioned, the minutia direction is defined in the NIST Data Exchange Standard Definition (Sub-section 16.1.4). With a bifurcation point, a direction toward the middle of two branching skeleton units is defined as the minutia direction. With an ending point, a direction in which a skeleton extends from the ending point is defined as the minutia direction.

When the type of an S-side paired minutia, which is a BPM candidate, is branch point B, and the type of an F-side paired minutia is ending point E, F-side ending point E is changed to bifurcation point B. Then, this bifurcation point B and an S-side bifurcation point B are combined into a pair which is chosen to be the BPM. In this event, two types of skeleton data and two types of paired minutia lists can be created depending on whether the skeleton forming an ending point is connected to a left or a right skeleton to form a bifurcation point. Skeleton data matching unit 21 creates and holds the two types of skeleton data. In any of the two types of skeleton data, bifurcation point, ending point are determined as the BPM.

When two types of skeleton data are created in the exceptional processing, the skeleton data are labeled F-Skel(1), Skel(2), respectively.

Next, description will be made on the processing at step A2 in the flow chart illustrated in FIG. 9. The processing at step A2 is divided into three sub-steps. The first sub-step A2-1 involves modifying the file side skeleton data and paired minutia list for those paired minutiae which are not determinate paired minutiae in such a manner that they have the same type. The second sub-step A2-2 involves deleting minutiae which do not form pairs between the S-side and F-side and which are in an opposing relationship from the F-side skeleton data. The opposing relationship refers to a relationship of minutiae which orient in opposite directions to each other to cause an unfavorable skeleton condition in view of the fingerprint matching. FIG. 12A illustrates paired minutiae which are in the opposing relationship. In FIG. 12A, circles represent minutiae, and the minutia direction is indicated by a fat line extending from each minutia. The third sub-step A2-3 involves deleting those minutiae which do not form pairs between the S-side and F-side, and are in the opposing relationship.

Figure 13:
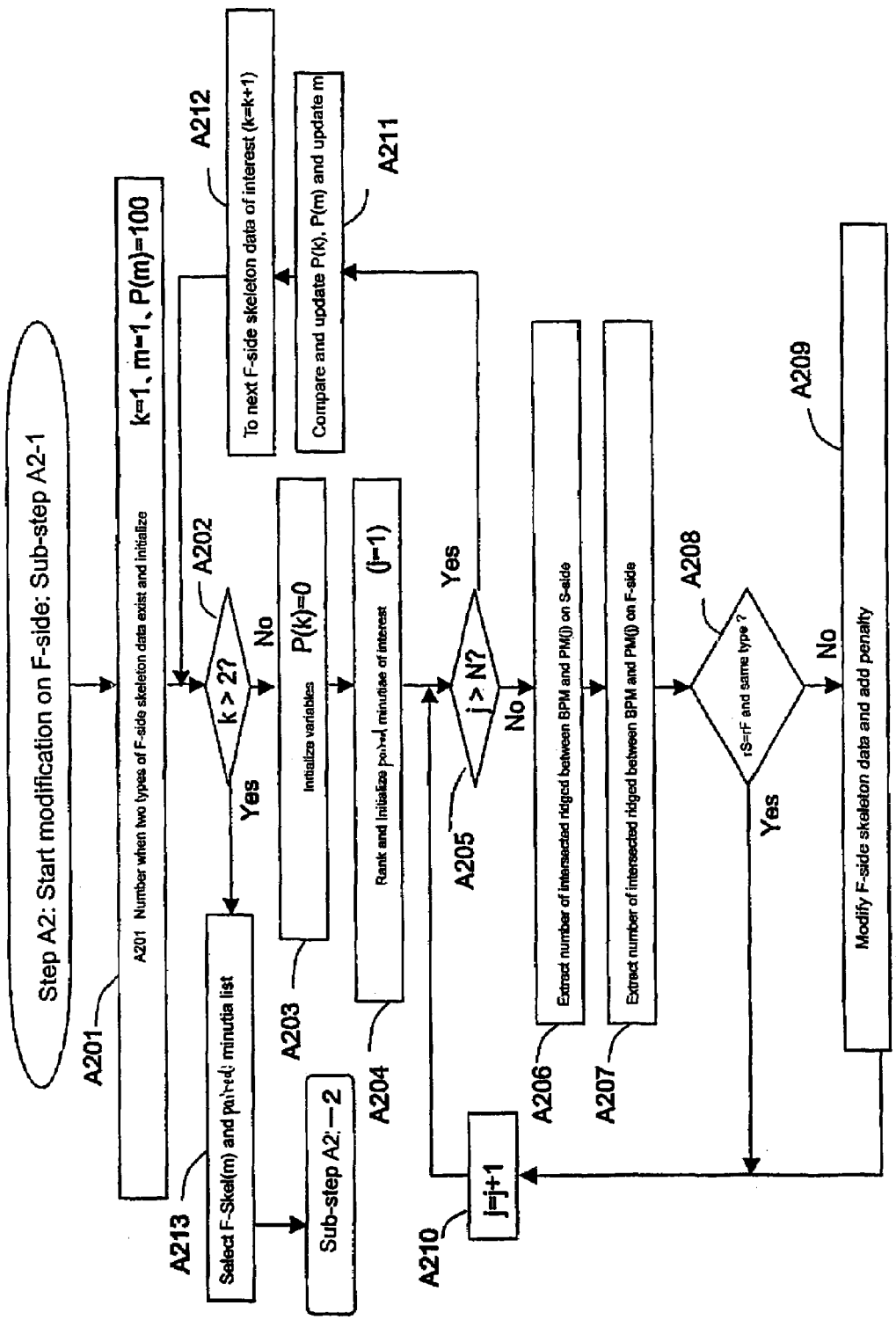
FIG. 13 is a flow chart illustrating a routine for modifying F-side skeleton data.

FIG. 13 illustrates the processing at sub-step A2-1. Sub-step A2-1 is executed on the assumption that the BPM comprises determinate paired minutiae. When there are two types of F-side skeleton data, skeleton data matching unit 21 sets an initial value k=1 at step A201. The value k used at sub-step A201 is a variable for orderly selecting F-Skel(1) and F-Skel(2), and selected skeleton data is represented by F-Skel(k). Skeleton data matching unit 21 sets initial values m=1 and P(m)=100, where $\underline{m}$ is a variable for identifying F-Skel(k) that has the smallest penalty, and P(m) is a minimum penalty value for each F-Skel(k). While the initial value for P(m) is herein set to 100, the initial value for P(m) may be any value as long as it is sufficiently larger than P(k).

After step A201, skeleton data matching unit 21 determines at step A202 whether or not the selection for F-Skel(1) and F-Skel(2) have been made. If k>2 is satisfied, skeleton data matching unit 21 determines that F-Skel(1) and F-Skel(2) have been selected, followed by a transition of the processing to step A213. If k>2 is not satisfied, skeleton data matching unit 21 sets an initial value P(k)=0 at step A203, where P(k) is a penalty corresponding to F-Skel(k) of interest.

Subsequent to step A203, skeleton data matching unit 21 determines an order in which respective paired minutiae are selected one by one. Skeleton data matching unit 21 also sets an initial value j=1, where $\underline{j}$ is a variable for orderly selecting paired minutiae one by one, and a selected paired minutia (i.e., paired minutia of interest) is represented by PM(j).

After step A204, skeleton data matching unit 21 determines at step A205 whether or not it has selected each paired minutia. If j>N is satisfied, skeleton data matching unit 21 determines that it has selected each minutia, followed by a transition of the processing to step A211. If j>N is not satisfied, skeleton data matching unit 21 finds a number rS of ridge lines which are intersected with a line segment that connects the BPM to paired minutia of interest PM(j), i.e., a line segment on the search side. At step A207, skeleton data matching unit 21 similarly finds a number rF of ridge lines which are intersected with a line segment that connects the BPM to paired minutia of interest PM(j), i.e., a line segment on the file side.

After step A207, skeleton data matching unit 21 determines at step A208 whether or not there is a difference between the numbers rS and rF of ridge lines which are interested with the respective line segments, as found at steps A206, A207, and also determines whether or not the paired minutia of interest on the S-side differs in type from that on the F-side. If there is no difference between rS and rF and if the paired minutiae of interest are identical in type on the S-side and F-side, the processing proceeds to step A210 where the value of j is incremented by one.

If the skeleton data matching unit 21 determines at step A208 rS ≠rF, or that the paired minutia of interest on the S-side differs in type from that on the F-side, skeleton data matching unit 21 modifies the file side skeleton data, and counts penalty P(k) in accordance with what kind of modification is made. In this event, skeleton data matching unit 21 modifies the file side skeleton data such that the paired minutiae of interest are identical in type on the S-side and on the F-side, and the same number of ridge lines exist between the BPM and paired minutiae of interest PM(j) on the S-side and F-side. Skeleton data matching unit 21 also modifies data on the file side minutiae included in the paired minutia list as well as the file side skeleton data.

FIG. 14 is a table of rules which define the specifics of modifications at step A209. Skeleton data matching unit 21 modifies file side skeleton data and the like, and counts penalty P(k) in accordance with the rules shown in FIG. 14. As shown in FIG. 14, the specifics of modifications and the values of penalty associated therewith are determined by the difference between rF and rS, the type of the S-side paired minutia of interest, and the type of the F-side paired minutia. Assume, for example, that the type of the S-side paired minutia of interest is ending point E, and the type of the F-side paired minutia of interest is bifurcation point B. In this event, when rF−rS=0, skeleton data matching unit 21 modifies the F-side paired minutia of interest, i.e., the bifurcation point such that "a skeleton closer to the BPM is separated," and adds one to P(k). On the other hand, if rF−rS=−1, skeleton data matching unit 21 modifies the F-side paired minutia of interest (bifurcation point) such that "a skeleton further away from the BPM is separated," and adds one to P(k). Further, if rF−rS=1, skeleton data matching unit 21 makes a modification to "delete data of paired minutiae of interest PM(j) from the paired minutia list," and adds five to P(k).

While the foregoing description has been made in connection with an example where the type of the S-side paired minutia of interest is ending point E and the type of the F-side paired minutia of interest is bifurcation point B in the rules shown in FIG. 14, the specifics of modifications and penalty are determined in a similar manner in other cases as well. It should be noted that when a modification can be made such that the number of ridge lines between the BPM and paired minutia of interest is identical on the S-side and F-side, a smaller penalty is determined.

Figure 15A:
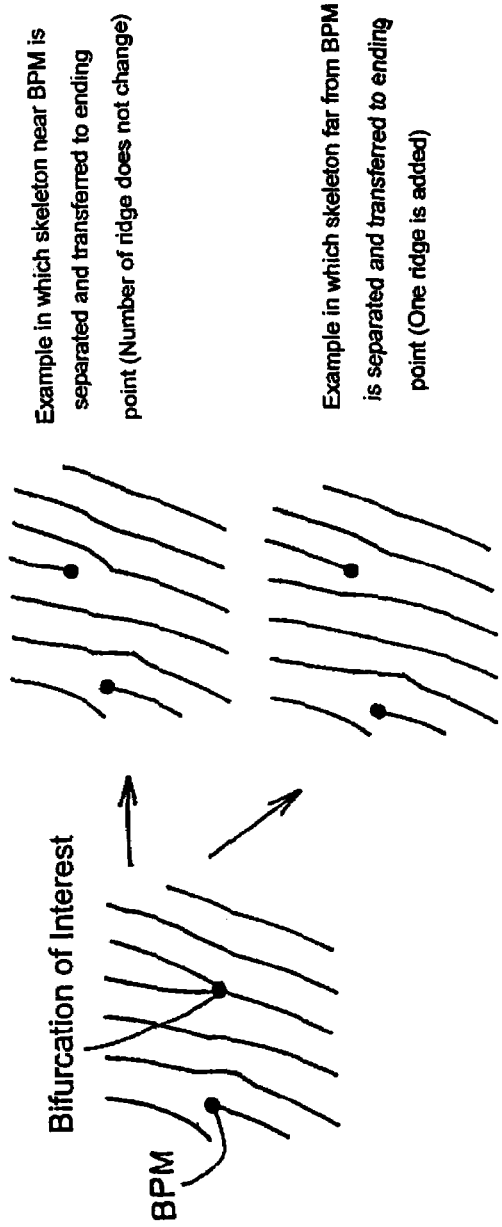
FIGS. 15A and 15B are diagrams for describing the processing for modifying a type of minutia.

FIG. 15A illustrates the processing performed when an F-side paired minutia of interest is a bifurcation point for modifying this bifurcation point to an ending point. Out of two skeletons divided from the bifurcation point, the skeleton closer to BPM or the skeleton further away from the BPM may be separated to change the bifurcation point to an ending point. The separation of which skeleton will result in a different number of ridge lines which are intersected with the line segment that connects the BPM to the F-side paired minutia of interest. The manner in which the skeleton is separated is determined in accordance with the rules shown in FIG. 14.

Figure 15B:
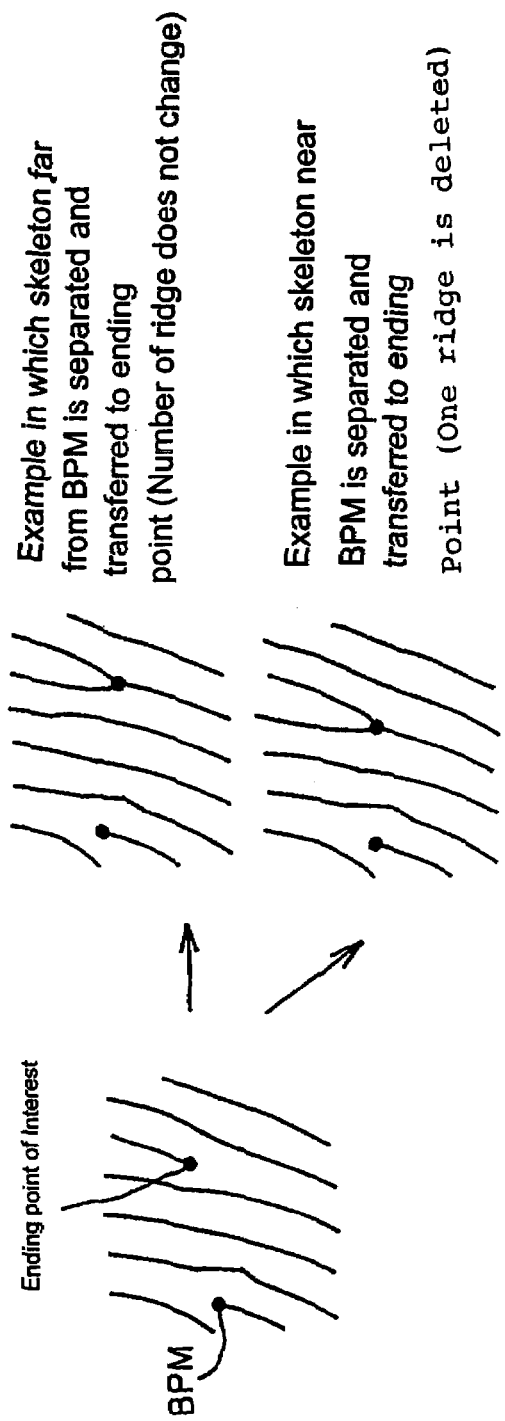

FIG. 15B illustrates the processing performed when an F-side paired minutia of interest is an ending point for modifying this ending point to a bifurcation point. An ending point can be changed to a bifurcation point by joining a skeleton which forms the ending point to a skeleton closer to BPM or a skeleton further away from the BPM. The connection of which skeleton will result in a different number of ridge lines intersected with a line segment that connects the BPM to the F-side paired minutia of interest. The manner in which the skeleton is joined is determined in accordance with the rules shown in FIG. 14.

FIGS. 16A and 16B illustrate a situation in which the type of an S-side and an F-side paired minutia of interest is an ending point, and the F-side paired minutia of interest is modified because rS≠rF. FIG. 16A illustrates an example in which the F-side paired minutia of interest is modified such that an extra ridge line is increased since the number of ridge lines existing between BPM and F-side paired minutia of interest is smaller by one than the number of ridge lines existing between the BPM and S-side paired minutia of interest. An ending point is joined to the skeleton further away from the BPM, and then the skeleton further away from the BPM is separated out of the branching skeletons, as illustrated in FIG. 16A, resulting in the addition of one ridge line. FIG. 16B illustrates an example in which the F-side paired minutia of interest is modified such that one ridge line is removed since the number of ridge lines existing between BPM and F-side paired minutia of interest is larger by one than the number of ridge lines existing between the BPM and S-side paired minutia of interest. An ending point is joined to the skeleton closer to the BPM, and then the skeleton closer to the BPM is separated out of the branching skeleton, as illustrated in FIG. 16B, resulting in the reduction of one ridge line.

FIGS. 17A and 17B illustrate a situation in which the type of an S-side and an F-side paired minutia of interest is a bifurcation point, and the F-side paired minutia of interest is modified because rS≠rF. FIG. 17A illustrates an example in which the F-side paired minutia of interest is modified such that an extra ridge line is increased since the number of ridge lines existing between BPM and F-side paired minutia of interest is smaller by one than the number of ridge lines existing between the BPM and S-side paired minutia of interest. A skeleton further away from the BPM is separated out of the branching skeletons, and the resulting ending point is joined to the skeleton further away from the BPM, as illustrated in FIG. 17A, resulting in the increase of one ridge line. FIG. 17B illustrates an example in which the F-side paired minutia of interest is modified such that one ridge line is removed since the number of ridge lines existing between BPM and F-side paired minutia of interest is larger by one than the number of ridge lines existing between the BPM and S-side paired minutia of interest. A skeleton closer to the BPM is separated out of the branching skeletons, and the resulting ending point is joined to the skeleton closer to the BPM, as illustrated in FIG. 17B, resulting in the reduction of one ridge line.

Skeleton data matching unit 21 makes modifications as illustrated in FIGS. 15A, 15B, 16A, 16B, 17A and 17B in accordance with the rules shown in FIG. 14. Then, skeleton data matching unit 21 adds a penalty in accordance with a particular modification to P(k), followed by termination of the processing at step A209.

After step A209, skeleton data matching unit 21 performs the processing at step A210, i.e., increments $j$, and repeats the operation at step A205 onward.

Upon determining at step A205 that each paired minutia has been selected, the skeleton data matching unit 21 compares the smallest penalty value P(m) so far counted with penalty P(k) for selected F-Skel(k) at step A211. If P(k)<P(m), P(m) is updated with the value of P(k), and $m$ is updated with the value of $k$. If P(k)≧P(m), no update is made. Subsequently, skeleton data matching unit 21 increments the value of $k$ by one to select next F-Skel(k) at step A212. When skeleton data matching unit 21 determines at step A202 in a later loop that k>2, this means that the selection has been completed for both F-Skel(1) and F-Skel(2). The value of $m$ at this time identifies the skeleton data which presents the smaller penalty. At step A213, skeleton data matching unit 21 identifies skeleton data F-Skel(m) using this value of $m$, and identifies a paired minutia list corresponding to this F-Skel(m). At step A212, the processing at sub-step A2-1 ends. In the subsequent processing, F-Skel(m) and paired minutia list identified at step A213 undergo the processing.

Figure 18:
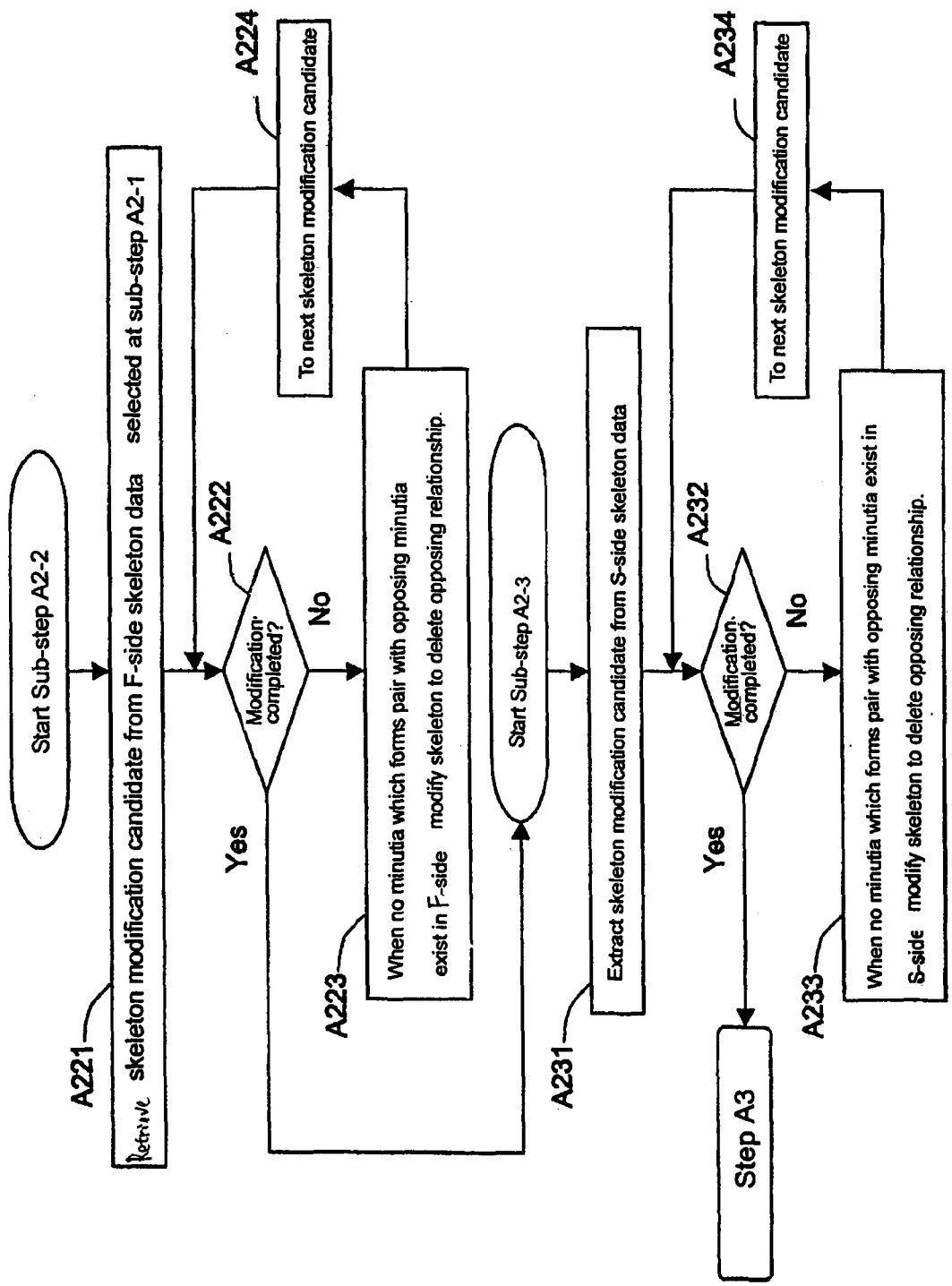
FIG. 18 is a flow chart illustrating a routine for deleting opposing minutiae.

Next, description will be made on sub-steps A2-2, A2-3. FIG. 18 illustrates the flow of the processing at sub-steps A2-2, A2-3.

At sub-step A2-2, skeleton data matching unit 21 deletes those minutiae which do not form pairs with counterparts on the S-side and are in the opposing relationship from the F-side skeleton data. Specifically, skeleton data matching unit 21 first extracts minutiae which are in the opposing relationship as illustrated in FIG. 12A, i.e., sets of opposing minutiae, from F-side skeleton data identified at sub-step A2-1, and orders the extracted sets of opposing minutiae at step A221. However, the extraction of all sets of opposing minutiae at step A221 is inefficient. Thus, skeleton data matching unit 21 may extract those determinate paired minutiae which exist within a predetermined range (for example, within 64 pixels) from the sets of opposing minutiae.

Subsequently, at step A222, skeleton data matching unit 21 determines whether or not the processing has been completed for all of the extracted opposing minutiae. If the modification has not been completed, skeleton data matching unit 21 selects one set of opposing minutiae in accordance with the order, and performs the processing on this set at step A233. Skeleton data matching unit 21 determines at step A233 whether or not a minutia which forms a pair with the selected opposing minutia exists on the S-side. If there is no minutia which forms a pair on the S-side, skeleton data matching unit 21 makes a modification to delete the opposing minutia. FIG. 12B shows a list which summarizes applicable modifications for deleting an opposing minutia. With the modification made to delete an opposing minutia, skeleton data matching unit 21 adds a penalty in accordance with the specifics of a particular modification to P(m) which has been finally calculated at sub-step A2-1. For example, with a "whisker," skeleton data matching unit 21 deletes a skeleton which forms the whisker, as instructed in FIG. 12B. Then, skeleton data matching unit 21 adds the length of the deleted skeleton multiplied by a predetermined coefficient to P(m) as a penalty.

A modification for providing a smooth connection can be implemented by known techniques as described, for example, in JP-A-2002-74381. For making a smooth skeleton connection with a "short interval contact," a "twisted disconnection," a "twisted contact" and the like, it is effective to reduce the skeleton at an ending point by the length equal to more or less the width of ridge line in addition to deletion of a skeleton between opposing minutiae.

There are a variety of known techniques for eliminating opposing minutiae. For example, U.S. Pat. No. 6,072,895 proposes the elimination of minutiae after extraction of skeleton data. U.S. Pat. No. 4,646,352 in turn describes that opposing minutiae are ignored when minutiae are matched.

After step A223, skeleton data matching unit 21 selects a set of opposing minutiae which is the next candidate for skeleton modification at step A224, and repeats the operation at step A222 onward. At step A222, if the modification has been completed for all of the extracted opposing minutiae, sub-step A2-2 ends, followed by the start of sub-step A2-3.

After sub-step A2-2, skeleton data matching unit 21 starts sub-step A2-3. At sub-step A2-3, skeleton data matching unit 21 deletes minutiae which do not form pairs with the F-side and are in the opposing relationship from S-side skeleton data. The contents of the processing at sub-step A2-3 is similar to those at sub-step A2-2. Steps A231, A232, A233, A234 shown in FIG. 18 are similar to steps A221, A222, A223, A224, respectively.

Figure 19:
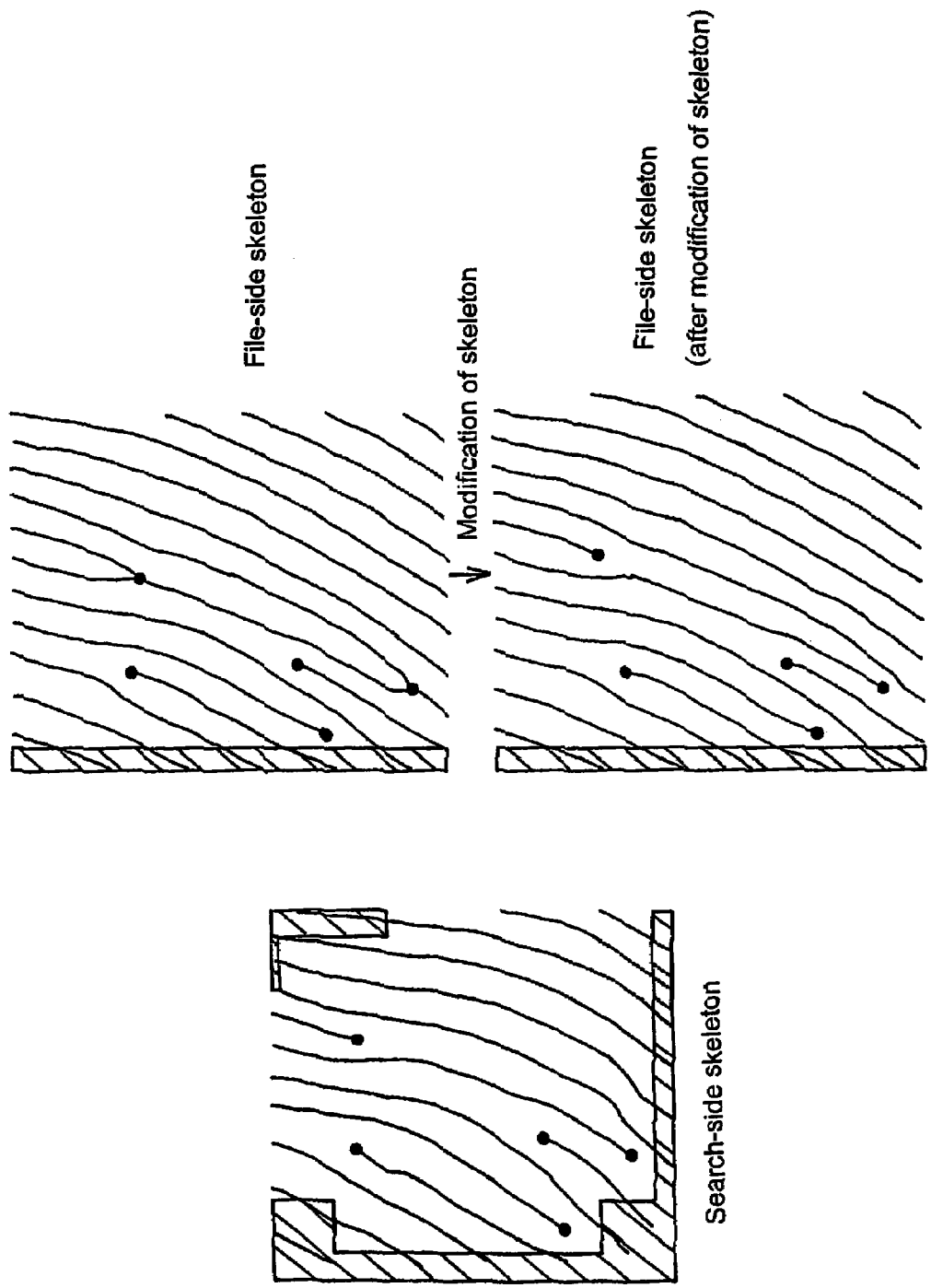
FIG. 19 is a diagram illustrating an exemplary change in an F-side skeleton associated with a modification.

The processing at step A2 ends at sub-step A2-3. FIG. 19 illustrates a change in F-side skeletons resulting from the processing at step A2. At the end of step A2, all paired minutiae on the paired minutia list are identical in type on the S-side and F-side. Here, the description on step A2 is concluded.

Next, description will be made on the processing at step A3 in the flow chart illustrated in FIG. 9. At step A3, skeleton data matching unit 21 checks whether each of S-side skeleton points has a corresponding F-side skeleton point. As previously described, a set of information on skeleton points which form a pair brought into correspondence between the search side and file side is referred to as the skeleton point correspondence list. FIG. 20 shows an exemplary skeleton point correspondence list. Skeleton data matching unit 21 creates the skeleton point correspondence list which is gradually updated with the progress of the check which is made on the correspondence relationship of skeleton points.

Skeleton data matching unit 21 selects S-side skeleton units, i.e., minimum skeleton units one by one, and selects every skeleton point on the selected skeleton unit. Then, skeleton data matching unit 21 checks the correspondence from the selected skeleton point to the F-side. The selection of the skeleton units and the like is made from the S-side because a latent which is placed on the search side generally has a smaller area and less minutiae. In the following description, a skeleton unit selected on the S-side, i.e., a skeleton unit for which the correspondence to the F-side is checked, is referred to as the "skeleton of interest." Also, a skeleton point which is on a skeleton of interest and is selected for checking the correspondence relationship with the F-side is referred to as the "skeleton point of interest" or simply the "point of interest." When a corresponding point corresponding to a point of interest exists on the F-side, the point of interest and corresponding point are referred to as the "determinate skeleton points." A determinate skeleton minutia and a determinate skeleton point which do not rest on a skeleton of interest are referred to as the "reference points." The reference points are utilized in checking the correspondence relationship for a point of interest.

Figure 21:
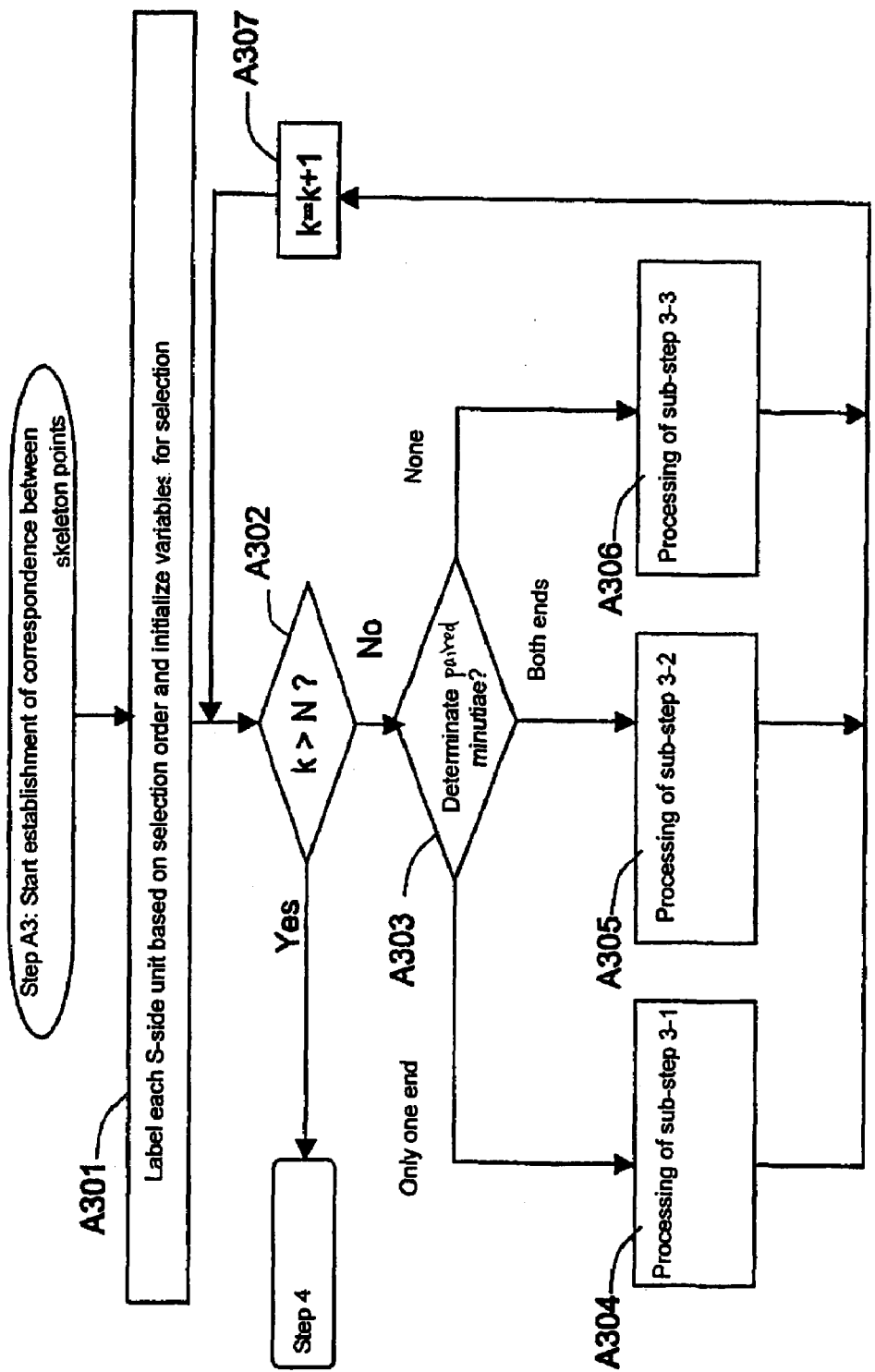
FIG. 21 is a flow chart illustrating a routine for bringing skeleton points into correspondence with each other.

FIG. 21 illustrates the processing at step A3, i.e., the flow of corresponding a skeleton point. Each skeleton unit on the S-side is labeled "S-Unit(n)" where "n" indicates the order in which S-side skeleton units are selected. Assuming that the total number of S-side skeleton units is N, $1 \leq n \leq N$ is established.

After starting step A3, skeleton data matching unit 20 first orders S-side skeleton units one by one at step A301. Skeleton data matching unit 20 also sets an initial value k=1. "k" at step A3 is a variable for selecting in order the S-side skeleton units one by one, and a selected skeleton unit is labeled "S-Unit(k)."

Now, description will be made on the criteria for determining the order of S-side skeleton units. The order is determined such that skeleton units connected to BPM are selected earlier. When the BPM of concern is an ending point, the order of a skeleton unit connected to this BPM is determined as the first position.

When the BPM of concern is a bifurcation point, this bifurcation point is regarded as an ending point, and the order is determined for three skeleton units connected to the ending point. In this event, the order is determined in the ascending direction as follows: (1) a skeleton unit which has a determinate paired minutia on the other end; (2) a skeleton unit which extends in a direction opposite to the minutia direction; (3) a skeleton unit which is placed immediately to the right of the minutia direction; and (4) a skeleton unit which is placed immediately to the left of the minutia direction. The directions referred to by "right" and "left" follow the previous description.

Figure 22:
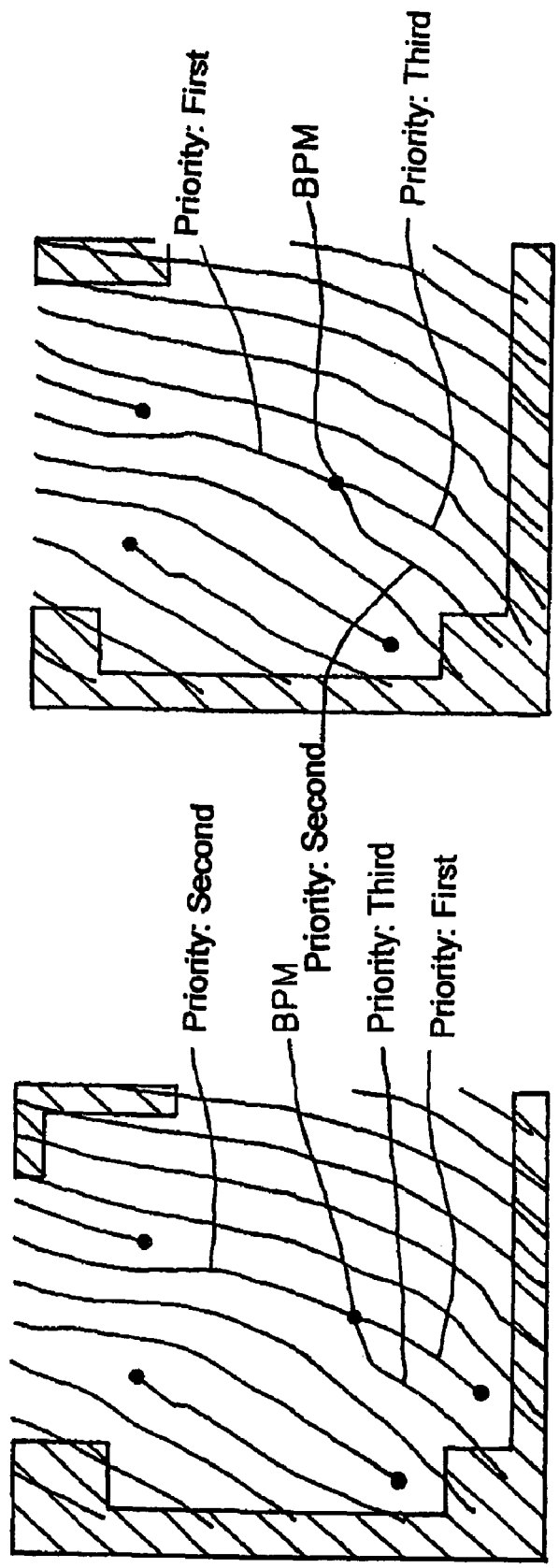
FIGS. 22A and 22B are diagrams each illustrating an exemplary ranking of skeleton units connected to BPM.

FIGS. 22A and 23B illustrate exemplary ordering of skeleton units which are connected to BPM that is a bifurcation point. In the example illustrated in FIG. 22A, the skeleton unit which is given "the highest priority" falls under (1) because it has a determinate paired minutia on the other end, and is therefore placed at the first position. The skeleton unit which is given "the next highest priority" in FIG. 22A falls under (2) because it extends in the direction opposite to the minutia direction at the BPM (direction from the BPM to the middle of two branching skeleton units), and therefore placed at the second position.

In the example illustrated in FIG. 22B, there is no skeleton unit which falls under (1). Therefore, a skeleton unit which extends in the direction opposite to the minutia direction at the BPM is shown to have the "highest priority." Also, a skeleton unit which is placed immediately to the right of the minutia direction at the BPM is shown to have the "next highest priority."

Figure 23:
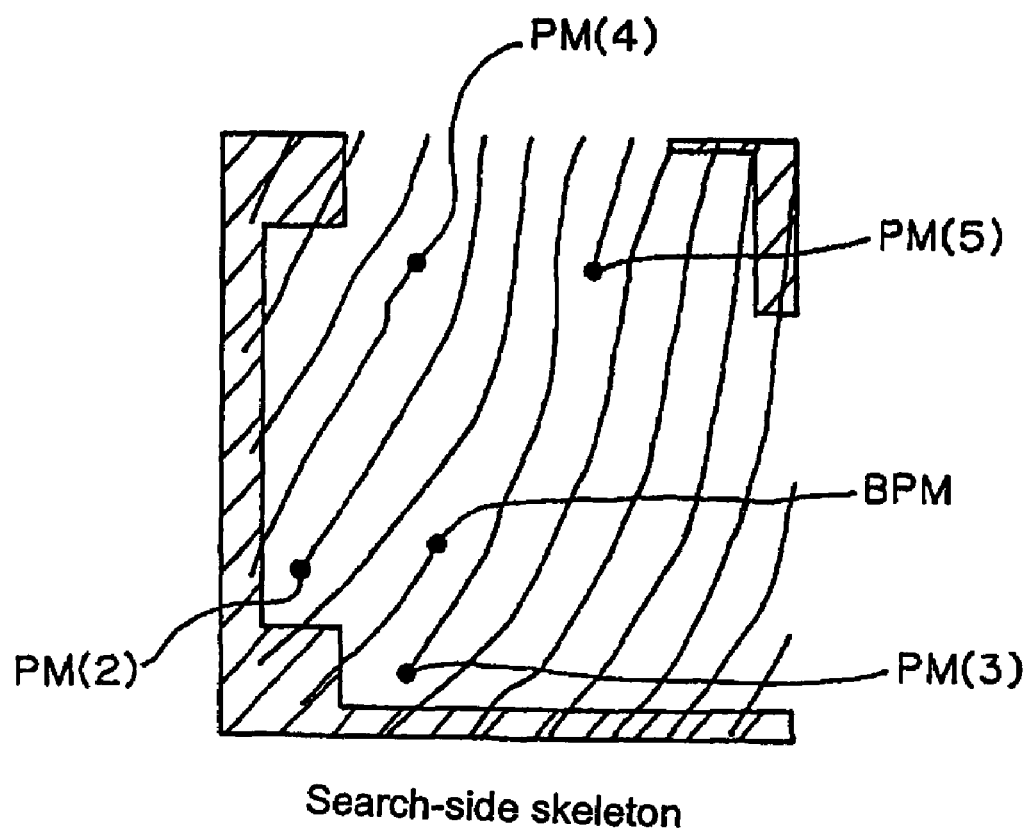
FIG. 23 is a diagram illustrating an exemplary ranking for determinate paired minutiae other than BPM.

After ordering the skeleton units connected to the BPM, skeleton data matching unit 21 selects one by one determinate paired minutiae which are closer to the BPM. Then, skeleton data matching unit 21 determines the order for skeleton units connected to the determinate paired minutiae from the one closest to the BPM. The ordering for skeleton units connected to determined minutiae other than the BPM is similar to the ordering for the skeleton units which are connected to the BPM. Specifically, if a determinate paired minutia of concern is an ending point, skeleton data matching unit 21 orders units connected to this ending point. When a determinate paired minutia of concern is a bifurcation point, skeleton data matching unit 21 regards this bifurcation point as an ending point, and determines the order for three skeleton units connected to the ending point in the ascending direction from (1) to (4). FIG. 23 illustrates exemplary ordering for determinate paired minutiae other than the BPM. As illustrated in FIG. 23, determinate paired minutiae except for the BPM are placed in an order in which they are closer to the BPM. Since there is no bifurcation point in this example, the ordering for determinate paired minutiae is the same as the ordering for skeleton units which are connected to the determinate paired minutiae.

Figure 24:
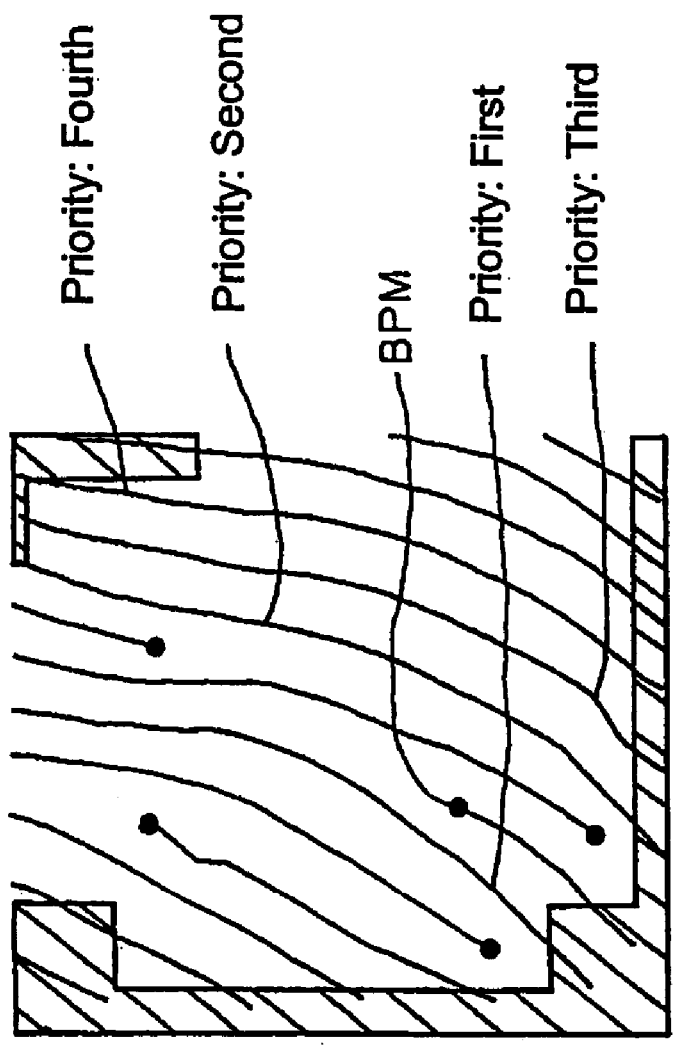
FIG. 24 is a diagram illustrating an exemplary ranking for skeleton units which are not connected to determinate paired minutiae.

Next, skeleton data matching unit 21 determines the order for skeleton units which are not connected to a determinate paired minutia. The skeleton units which are not connected to a determinate paired minutia are ordered such that they are given higher positions as they are closer to the BPM. FIG. 24 illustrates exemplary ordering for skeleton units which are not connected to a determinate paired minutia. As illustrated in FIG. 24, skeleton units closer to the BPM are given higher positions. For the skeleton units which are not connected to a determinate paired minutia, corresponding skeleton units do not always exist on the file side. On the other hand, a plurality of skeleton units on the file side may correspond to a single skeleton unit on the search side. As can be seen, FIG. 24 only illustrates skeleton units up to the fourth highest priority.

After the ordering for the S-side skeleton units, skeleton data matching unit 21 determines at step A302 whether or not the correspondence with the F-side has been completed for a skeleton point of each of the skeleton units for which the ordering has been determined. Skeleton data matching unit 21 determines that the correspondence with the F-side has been completed when k>N, followed by the flow proceeding to step A4. If $k \leq N$, skeleton data matching unit 21 determines at step A303 whether or not any determinate paired minutia exists on skeleton of interest S-Unit(k). The result of this determination is classified into the following three cases. A first case is applied to skeleton of interest S-Unit(k) which has a determinate paired minutia (including the BPM) only at one end. A second case is applied to S-Unit(k) which has determinate paired minutiae (including the BPM) at both ends. A third case is applied to S-Unit(k) which has no determinate paired minutia.

In the first case, skeleton data matching unit 21 performs processing at sub-step A3-1, later described. In the first case, skeleton of interest S-Unit(k) has a determinate paired minutia only at one end thereof (including the BPM). At sub-step 3-1, skeleton data matching unit 21 selects skeleton points one by one in an order in which they are closer to the determinate paired minutia, and checks whether or not a skeleton point corresponding to the selected skeleton point (point of interest) exists on the F-side. It should be noted that a point of interest handled at sub-step A3-1 is a continuous point on the S-side (labeled "SC") or an extensive end point on the S-side (labeled "SX"). When "S" or "F" is prefixed to a variety of symbols such as "C," "X" and the like indicative of the type, "S" or "F" indicates the search side or file side.

In the second case, skeleton data matching unit 21 performs processing at sub-step A3-2, later described. In the second case, skeleton of interest S-Unit(k) has determinate paired minutiae on both ends thereof (including the BPM). At sub-step A3-2, skeleton data matching unit 21 selects skeleton points one by one in an order in which they are closer to the determinate paired minutia that is closer to the BPM, and checks whether or not a skeleton point corresponding to the selected skeleton point (point of interest)

exists on the F-side. In this case, skeleton data matching unit 21 determines a skeleton point on the F-side based on the ratio of skeleton distances from the point of interest to both ends. It should be noted that a point of interest handled at sub-step A3-2 is only S-side continuous point SC.

In the third case, skeleton data matching unit 21 performs processing at sub-step A3-3, later described. In the third case, no determinate paired minutia exist on skeleton of interest S-Unit(k). Since skeleton units which fall under the third case are given lower priorities, sub-steps A3-1, A3-2 have already ended at the time sub-step A3-3 is executed. When skeleton data matching unit 21 checks the correspondence relationship with an F-side skeleton point, it uses a skeleton point which is determined to be a determinate skeleton point at sub-step A3-1 or A3-2.

After sub-step A3-1, A3-3 or A3-3, skeleton data matching unit 21 increments k by one to select a new skeleton of interest at step A307.

The following description will be made on the processing at steps A3-1 to A3-3. From sub-step A3-1 to sub-step A3-3, a large number of terms are used. For convenience, FIG. 25 shows a table of correspondence between terms used for S-side data and terms used for F-side data.

Figure 26:
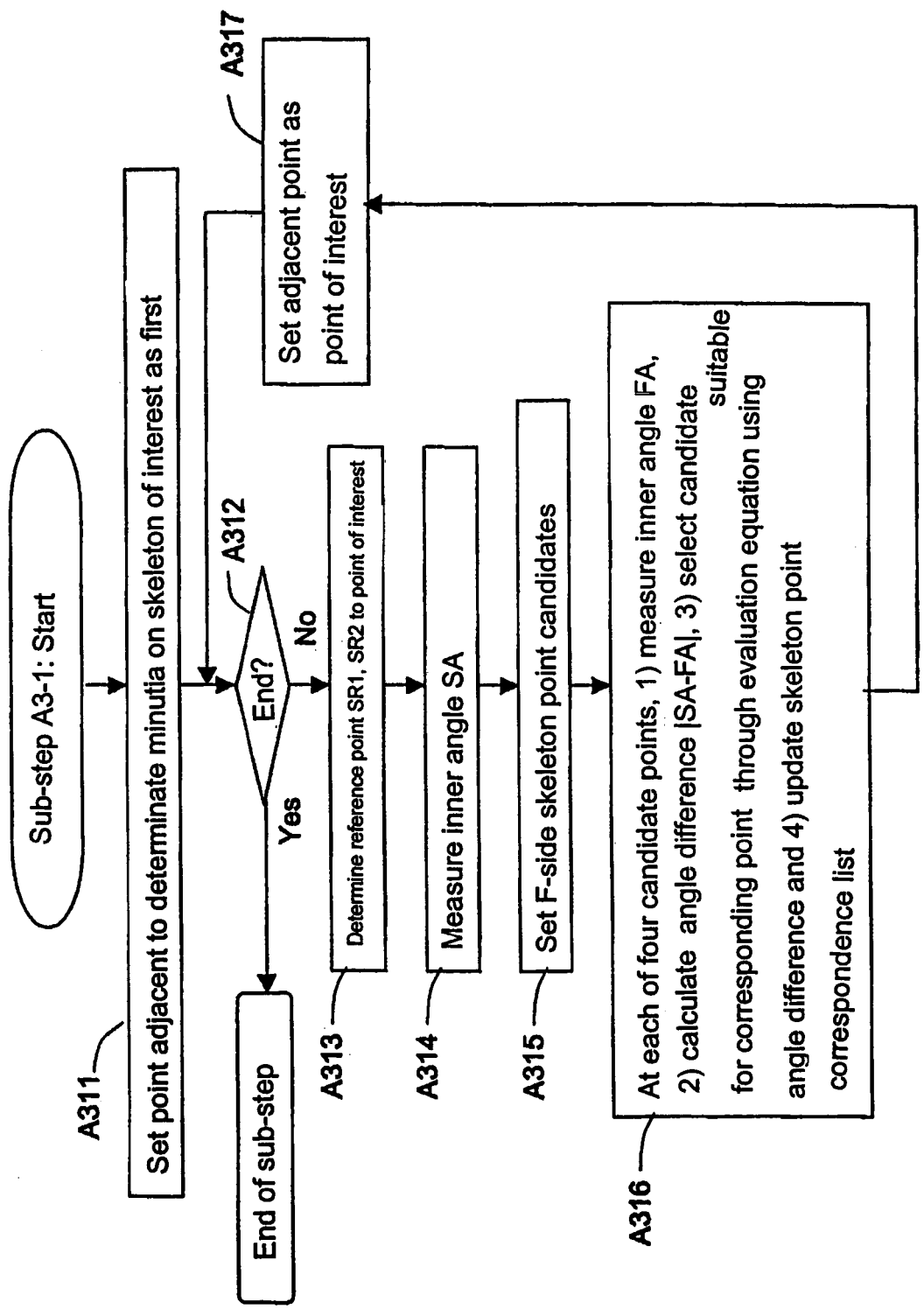
FIG. 26 is a flow chart illustrating a routine for bringing skeleton points into correspondence with each other.
Figure 27:
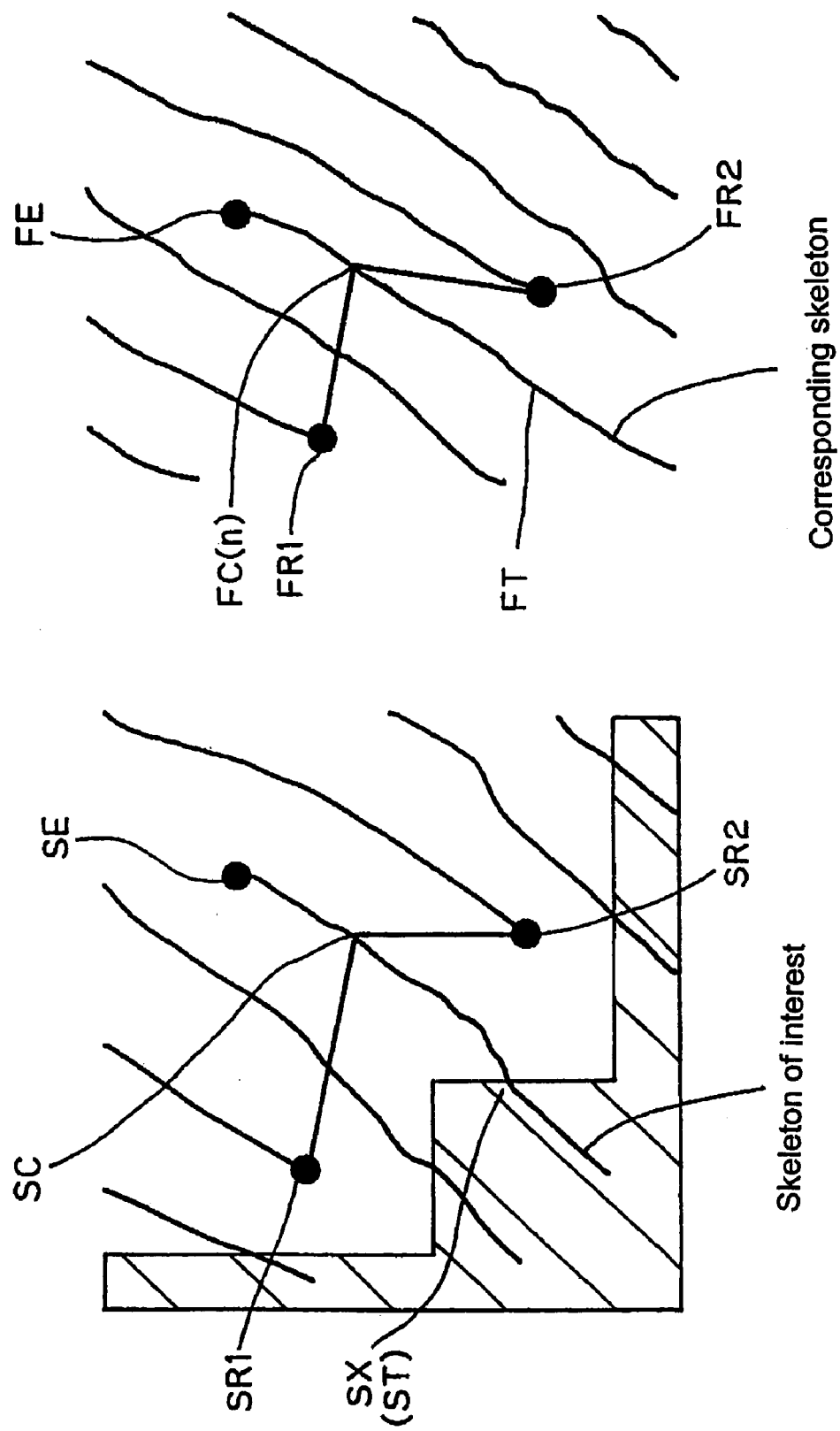
FIG. 27 is a diagram illustrating an exemplary correspondence of points of interest to corresponding points.

FIG. 26 illustrates an exemplary flow of the processing at sub-step A301. FIG. 27 in turn describes the correspondence of a point of interest to a corresponding point at sub-step A3-1. The processing at sub-step A301 is intended for a skeleton of interest which has a determinate paired minutia only on one end thereof, as the skeleton of interest illustrated in FIG. 27. While FIG. 27 shows that the determinate paired minutia is an ending point, the determinate paired minutia may be a bifurcation point. Even with a bifurcation point, it can be regarded as an ending point by separating a skeleton. Therefore, in the following description, this determinate paired minutia is represented by determinate ending point SE, using "E." The correspondence has previously been established between S-side determinate ending point SE and F-side determinate ending point FE.

After starting sub-step A3-1, skeleton data matching unit 21 first sets (selects) a point adjacent to determinate ending point SE on a skeleton of interest as the first point of interest at step A311. This point of interest is S-side continuous point SC. As illustrated in the left-hand figure in FIG. 28, continuous point SC adjacent to determinate ending point SE is selected as the first point of interest.

After step A311, skeleton data matching unit 21 determines at step A312 whether or not sub-step A3-1 is terminated. The condition which causes termination of sub-step A3-1 will be described later. If the terminating condition is not satisfied, skeleton data matching unit 21 selects the nearest reference point from each of both ends of a line segment which connects determinate ending point SE to point of interest SC at step A313. The reference points are labeled SR1, SR2, respectively (see FIG. 27). It should be noted that a selection of three or more reference points can improve the accuracy for the correspondence but causes an increase in processing time. In the example given herein, two reference points SR1, SR2 are selected for purposes of description. At step A314, skeleton data matching unit 21 measures inner angle SA which is formed by a line segment that connects reference point SR1 to point of interest SC and a line segment that connects point of interest SC to reference point SR2. This inner angle SA can be represented by:

$$SA = \angle(SR1, SC, SR2)$$

Next, skeleton data matching unit 21 selects a candidate corresponding point which corresponds to point of interest SC. An F-side skeleton point which has been previously confirmed that it corresponds to a skeleton point on a skeleton of interest is designated "apparent determinate point FC(0)." Skeleton data matching unit 21 selects three outer adjacent points of FC(0) as corresponding point candidates FC(1)-FC(3). Also, apparent determinate point FC(0) is included in corresponding point candidates. Outer adjacent points of a certain skeleton point refer to those skeleton points which form in a line from the skeleton point such that the resulting line withdraws from determinate ending point FE. For example, as illustrated in FIG. 28, assume that point of interest SC is an adjacent point of determinate ending point SE. In this event, the apparent determinate point is FE which corresponds to SE. Three skeleton points which extend to withdraw from FE are outer adjacent points of apparent determinate point FE. Skeleton data matching unit 21 selects FE and the three points as corresponding point candidates FC(0) to FC(3).

The number of corresponding point candidates except for FC(0) need not be three. However, the number of corresponding point candidates except for F(0) is preferably three in consideration of the maximum distance ($\sqrt{2}$) to the adjacent skeleton point, distortions, expansion, contraction of the images, and the like.

When outer adjacent points FC(1) to FC(3) include a non-determinate paired minutia (paired minutiae which are dissimilar in type on the S-side and F-side), outer adjacent points subsequent to the non-determinate paired minutia are excluded from corresponding point candidates.

At step A316, skeleton data matching unit 21 determines a corresponding point from corresponding point candidates FC(0) to FC(3). When FC(1) adjacent to apparent determinate point FC(0) is simply determined to be a corresponding point for point of interest SC, some contradiction may be found in the positional relationship. To avoid this inconvenience, a corresponding point is determined in consideration of the "positional relationship between the point of interest and a group of adjacent reference points." Skeleton data matching unit 21 determines F-side reference points FR1, FR2 corresponding to reference points SR1, SR2 (see FIG. 27). Then, skeleton data matching unit 21 measures, for each candidate, inner angel FA which is formed by a line segment that connects reference point FR1 to the corresponding point candidate and a line segment that connects the corresponding point candidate to reference point FR2. Inner angle FA can be represented by:

$$FA = \angle(FR1, FC(n), FR2)$$

In FC(n), $0 \leq n \leq 3$.

Then, skeleton data matching unit 21 evaluates each corresponding point candidate (each inner angle) with equation (1):

$$y1 = k1 + k2 \times |SA - FA| \tag{1}$$

Specifically, skeleton data matching unit 21 calculates y1 for each FA, and determines a corresponding point candidate which presents minimum y1 as the corresponding point. In equation (1), however, k1 is determined for each corresponding point candidate. Upon evaluation of FC(0), k1 is set to one (k1=1). With FC(1), k1 is set to zero (k1=0). With FC(2), k1 is set to one (k1=1). With FC(3), k1 is set to three (k1=3). k2 used in equation (1) is a coefficient associated with an angle difference, and is set to 0.2 in this example (k2=0.2). The determined corresponding point FC(n) and point of interest SC are selected as determinate skeleton points. Skeleton data matching unit 21 additionally provides the skeleton point correspondence list with information stating that determined corresponding point FC(n) corresponds to point of interest SC. The newly corresponded FC(n) is used as an apparent determinate point when step A315 is executed next time.

At step S317, skeleton data matching unit 21 sets an adjacent point to the determinate skeleton point, which has been finally brought into correspondence, as new point of interest SC. In other words, an adjacent point to the so far remarked point of interest is set as new point of interest SC. Subsequently, skeleton data matching unit 21 repeats the operation at step A312 onward.

At step A312, skeleton data matching unit 21 determines that sub-step A3-1 is terminated when any of the following first to fourth conditions is satisfied. A first condition is satisfied when the correspondence is completed for S-side extensive end point SX. A second condition is satisfied when F-side extensive end point FX is determined as a corresponding point in the correspondence which is made for certain point of interest SC. A third condition is satisfied when a non-determinate paired minutia is selected as a new point of interest SC at step A317. The non-determinate paired minutia refers to a paired minutia which does not match in type with the counterpart. A fourth condition is satisfied when an adjacent point to an F-side final corresponding point is a non-determinate paired minutia. When sub-step A3-1 is terminated in response to the satisfaction of the first or second condition, S-side point of interest which is finally brought into correspondence is labeled "ST," and an F-side skeleton point corresponding to ST is labeled "FT." For example, when sub-step A3-1 is terminated in response to the satisfaction of the first condition, S-side extensive end point SX is designated as ST, and its corresponding point as FT (see FIG. 27).

Figure 29:
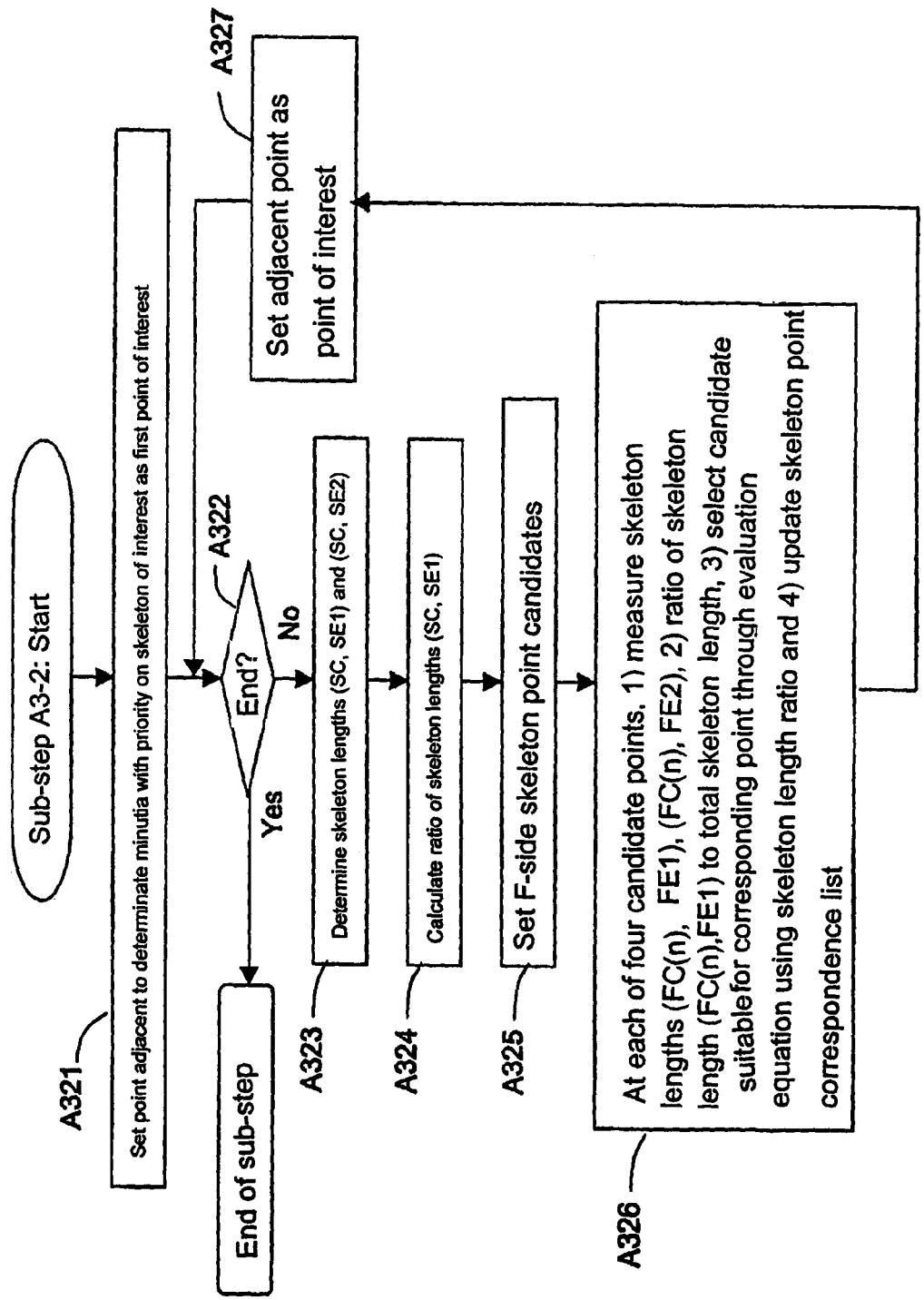
FIG. 29 is a flow chart illustrating a routine for bringing skeleton points into correspondence with each other.

FIG. 29 illustrates an exemplary flow of the processing at sub-step A3-2. The processing at sub-step A3-2 is intended for a skeleton of interest which has determinate paired minutiae (including BPM) at both ends thereof. Similar to sub-step A3-1, a determinate paired minutia is regarded as a determinate ending point, and is represented by symbol "E." At sub-step A3-2, skeleton data matching unit 21 progresses the processing from a determinate end point which is BPM or a determinate end point closer to the BPM out of the determinate ending points at both ends. This determinate ending point (S-side) is labeled "SE1." The other determinate ending point is labeled "SE2."

After starting sub-step S3-2, skeleton data matching unit 21 sets (selects) a point adjacent to determinate ending point SE1 on the skeleton of interest as the first point of interest. The first point of interest is determined in a manner similar to the illustration in FIG. 28. It should be noted that at sub-step A3-2, only continuous point SC is designated as a point of interest.

After step A321, skeleton data matching unit 21 determines at step A322 whether or not sub-step A3-2 is terminated. The condition which causes termination of sub-step A3-2 will be described later. If the terminating condition is not satisfied, skeleton data matching unit 21 measures a skeleton length from point of interest SC to determinate ending point SE1, from which the processing has been started, at step A323. The skeleton length between SC and SE1 is labeled "SD1." Skeleton length SD1 is preferably a curved distance along the skeleton of interest rather than a straight line distance. This is because a straight line distance is more susceptible to image distortions and the like. In this example, in a movement from SC to SE1 along the skeleton of interest, skeleton data matching unit 21 accumulates a distance unit (one pixel) in response to each movement to an upper, lower, left or right pixel, and accumulates 1.4 pixels ($\sqrt{2}$ pixels) in response to each movement to a pixel in an oblique direction to find the distance. Skeleton data matching unit 20 also measures the skeleton length (labeled "SD2") from the other determinate ending point SE2 to point of interest SC in a similar manner.

Next, at step A324, skeleton data matching unit 21 calculates ratio Rs of SD1 to the total sum of skeleton distances SD1, SD2. Specifically, Rs is calculated by the equation Rs=SD1/(SD1+SD2).

Next, at step A325, skeleton data matching unit 21 selects corresponding point candidates corresponding to point of interest SC in a manner similar to the previously described step A315. In this example, skeleton data matching unit 21 selects four corresponding point candidates FC(0) to FC(4). FC(0) is an apparent determinate point which has been finally brought into correspondence.

At step A326, skeleton determinate unit 21 determines a corresponding point from corresponding point candidates FC(0) to FC(3). When FC(1) adjacent to apparent determinate point FC(0) is simply determined to be a corresponding point for point of interest SC, some contradiction may be found in the positional relationship. To avoid this inconvenience, a corresponding point is determined in consideration of the "ratio of the distances from the non-determinate minutiae at both ends to the point of interest." Skeleton data matching unit 21 measures a skeleton distance from each of corresponding point candidates FC(0) to FC(3) to each of determinate ending points FE1, FE2. FE1, FE2 are F-side determinate ending points which correspond to SE1, SE2, respectively. The skeleton distances from a corresponding point candidate to FE1, FE2 are designated by FD1(n), FD2(n), respectively, where n=0-3 which correspond to the respective candidates.

Next, skeleton data matching unit 21 calculates ratio Rf of FD1(n) to the total sum of FD1(n) and FD2(n) for each of n from 0 to 3. Specifically, Rf is calculated by the equation Rf=FD1(n)/(FD1(n)+FD2(n)). Then, skeleton data matching unit 21 determines a corresponding point candidate which presents the minimum |Rf−Rs| as a corresponding point. This corresponding point and point of interest SC are selected as determinate skeleton points. Skeleton data matching unit 21 additionally provides the skeleton point correspondence list with information stating that determined corresponding point corresponds to point of interest SC. The F-side corresponding point corresponded to point of interest SC is used as an apparent determinate point when step A325 is executed next time.

At step A327, skeleton data matching unit 21 sets a point adjacent to the determinate skeleton point, which has been finally brought into correspondence, as new point of interest SC. In other words, a point adjacent to the so far remarked point of interest is selected as a new point of interest SC. Subsequently, skeleton data matching unit 21 repeats the operation at step A322 onward. At step A322, the processing is terminated on condition that newly set point of interest SC is the same as determinate ending point SE2.

Figure 30:
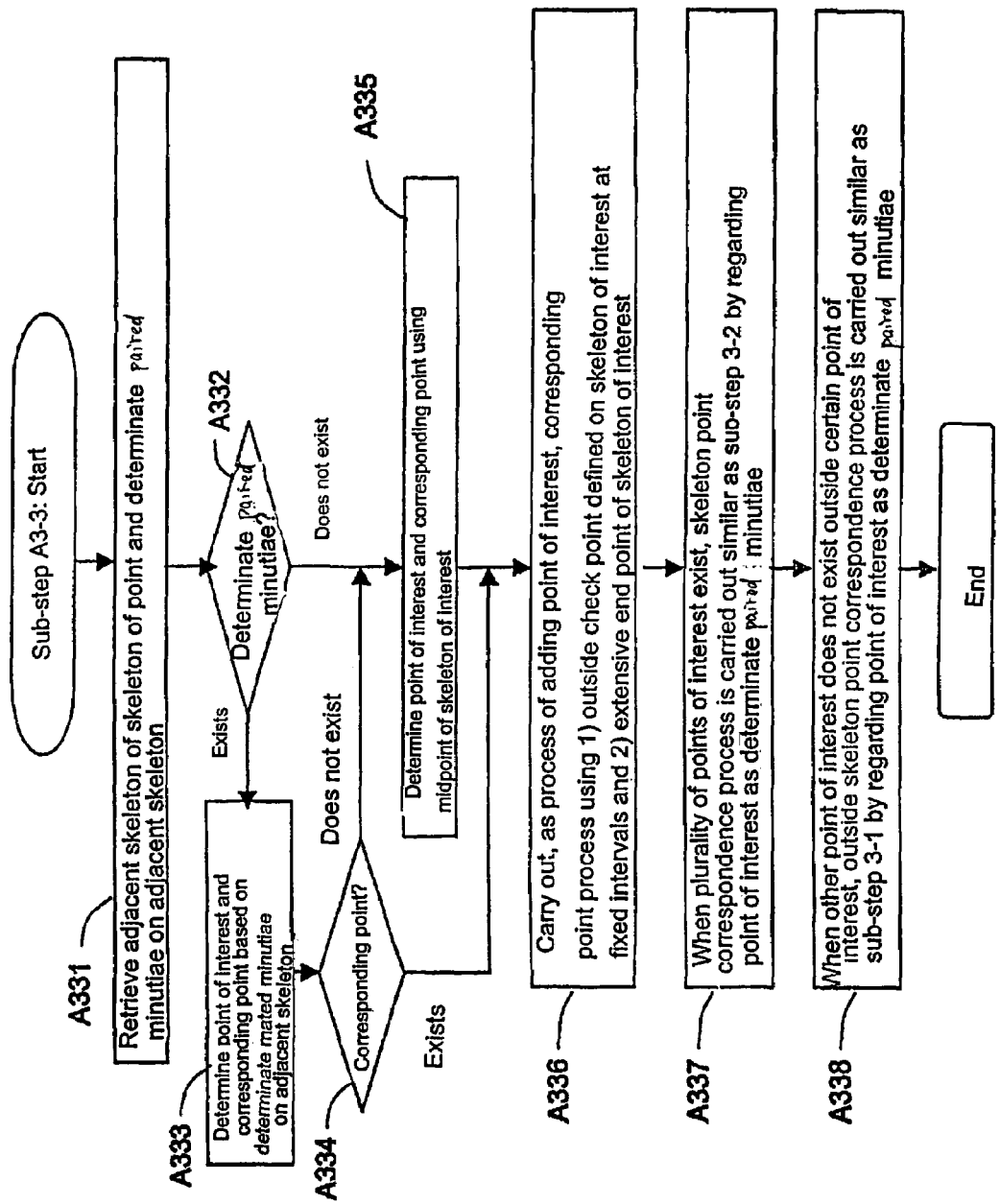
FIG. 30 is a flow chart illustrating a routine for bringing skeleton points into correspondence with each other.

FIG. 30 illustrates an exemplary flow of the processing at sub-step A3-3. The processing at sub-step A3-3 is intended for a skeleton of interest which has no determinate paired minutia. When sub-step A3-3 is executed, sub-steps A3-1, A3-2 have been executed. Therefore, determinate skeleton points and determinate paired minutiae exist on skeletons other than a skeleton of interest. At step A3-3, skeleton data matching unit 21 performs the processing involved in bringing skeleton points into correspondence with the foregoing points for use as reference points.

After starting sub-step A3-3, skeleton data matching unit 21 first retrieves all skeletons adjacent to a skeleton of interest at step A331. Further, skeleton data matching unit 21 retrieves determinate paired minutiae from the retrieved adjacent skeletons. The adjacent skeleton is defined to be a skeleton which permits a perpendicular descending from a point thereon to a skeleton of interest can reach the skeleton of interest without intersecting other skeletons. When a perpendicular can directly reach even a portion of the skeleton of interest, this falls under the adjacent skeleton. The adjacent skeleton existing on one side of the skeleton of interest is not limited to only one, but two or more adjacent skeletons may exist in some cases. Describing a skeleton of interest shown in FIG. 31A as an example, there are two adjacent skeletons in a region on one side of the skeleton of interest in which BPM exists. In a region on the opposite side of the skeleton of interest, there is one adjacent skeleton.

After step A331, skeleton data matching unit 21 determines at step A332 whether or not a determinate paired minutia can be retrieved from the adjacent skeletons. When the determinate paired minutia can be found, skeleton data matching unit 21 determines an S-side point of interest using the determinate paired minutia as a reference point, and brings the point of interest into correspondence with an F-side skeleton point at step A333.

Figures 31A, 31B:
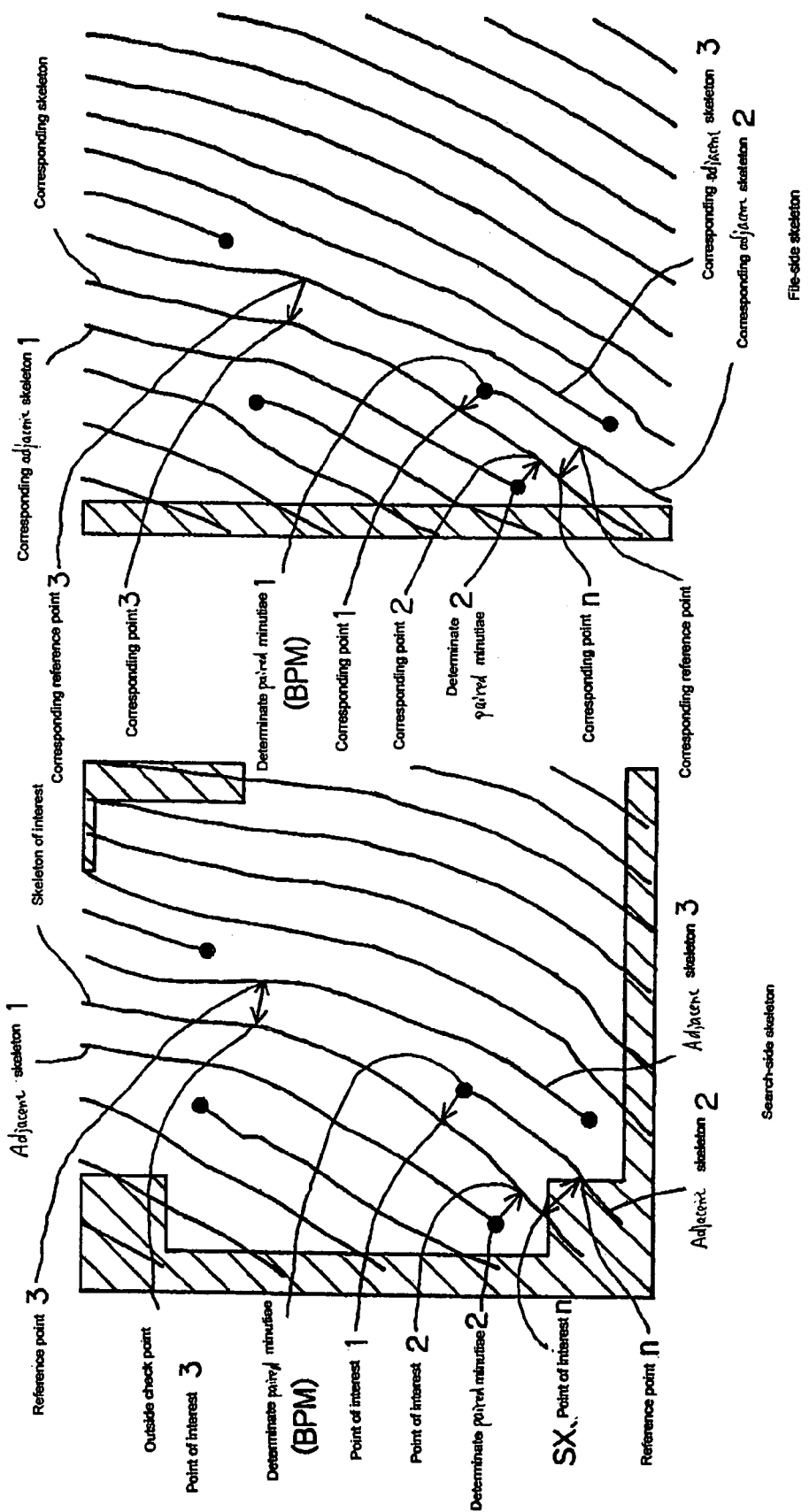
FIGS. 31A and 31B are diagrams each for describing the processing for determining points of interest and corresponding points.

At step A333, skeleton data matching unit 21 draws a perpendicular from the determinate paired minutia on the adjacent skeleton down to the skeleton of interest, and assigns the foot of the perpendicular as an S-side point of interest. For example, in the example illustrated in FIG. 31A, determinate paired minutiae 1, 2 exist on adjacent skeletons 2, 1, respectively. The feet of perpendiculars drawn down from determined minutiae 1, 2 are assigned as points of interests 1, 2, respectively. In FIG. 31A, the perpendiculars drawn from the determined determinate paired minutiae and the like down to the skeleton of interest are indicated by arrows. When a perpendicular drawn down from a determinate paired minutia does not reach the skeleton of interest, this matching skeleton is ignored, and a perpendicular is drawn down from the next determinate paired minutia.

Next, skeleton data matching unit 21 draws a perpendicular line from an F-side determinate paired minutia which corresponds to the matching point on the adjacent skeleton down to a corresponding skeleton, i.e., an F-side skeleton corresponding to the skeleton of interest. If the perpendicular intersects the corresponding skeleton, skeleton data matching unit 21 determines the intersection (the feet of perpendiculars) as a corresponding point corresponding to the S-side point of interest. In the example illustrated in FIG. 31B, determinate paired minutiae 1, 2 exist on corresponding adjacent skeletons 2, 1 which correspond to S-side adjacent skeletons. The feet of perpendiculars drawn from these determinate paired minutiae 1, 2 down to the corresponding skeletons are assigned as corresponding points 1, 2, respectively. These corresponding points correspond to point of interest 1, 2 shown in FIG. 31A. Likewise, on the F-side, if a perpendicular drawn down from a determinate paired minutia does not reach a corresponding skeleton, this determinate paired minutia is ignored, and a perpendicular is drawn down from the next determinate paired minutia.

When perpendiculars are drawn down from S-side and F-side determinate paired minutiae, a determinate paired minutia is ignored if a perpendicular drawn down from this determinate paired minutia has a length equal to or longer than a predetermined value, for example, double of an average ridge line interval, and a perpendicular is drawn down from the next determinate paired minutia.

Next, skeleton data matching unit 21 determines at step A334 whether or not a corresponding point can be found on the F-side based on each of determinate paired minutiae on the adjacent skeletons.

Upon determining at step A332 that no determinate paired minutia can be retrieved from the adjacent skeletons, skeleton data matching unit 21 determines the median point for the skeleton of interest, and brings the median point into correspondence with an F-side skeleton point at step A335. Likewise, when determining at step A334 that no corresponding point can be found on the F-side, similar processing is performed. Skeleton data matching unit 21 determines a skeleton point which is distanced by the same skeleton distance from both ends of the skeleton of interest as the median point of the skeleton of interest. In the example illustrated in FIG. 32A, the median point is indicated by a circle. The skeleton of interest has an extensive end point or a non-determinate paired minutia at both ends thereof.

Skeleton data matching unit 21 draws a perpendicular from the median point down to an adjacent skeleton which exists in a region that includes the BPM, and determines whether or not the foot of the perpendicular can be a reference point. Specifically, when a foot of perpendicular drawn down to an adjacent skeleton is a determinate skeleton point, and a point corresponding to the foot of perpendicular exists on the F-side, the foot of perpendicular is used as a reference point. In the example illustrated in FIG. 32A, a foot of perpendicular drawn from the median point down to the adjacent skeleton is designated "reference point 1." If the foot or perpendicular is not a reference point, a skeleton point on the skeleton of interest cannot be brought into correspondence with the counterpart on the F-side. In this event, sub-step A3-3 is terminated at step A335, followed by selection of the next skeleton of interest.

Next, skeleton data matching unit 21 draws a perpendicular from the reference point down to the skeleton of interest, and designates the intersection as a point of interest if the perpendicular intersects the skeleton of interest (at the foot of perpendicular). This point of interest may coincide with the previously determined median point or may slightly shift therefrom. If the perpendicular does not intersect the skeleton of interest, sub-step A3-3 is terminated at step A335, followed by selection of the next skeleton of interest.

Next, skeleton data matching unit 21 draws a normal from the reference point down to the skeleton of interest, and designates the intersection as a point of interest if the normal intersects the skeleton of interest (at the toe of the normal). This point of interest may coincide with the previously determined median point or may slightly shift therefrom. If the normal does not intersect the skeleton of interest, sub-step A3-3 is terminated at step A335, followed by selection of the next skeleton of interest.

Sub-step A3-3 is also terminated when the length of the perpendicular is equal to or longer than a predetermined value, for example, double of the average ridge line interval, as determined at step A335, followed by selection of the next skeleton of interest.

Figures 32A, 32B:
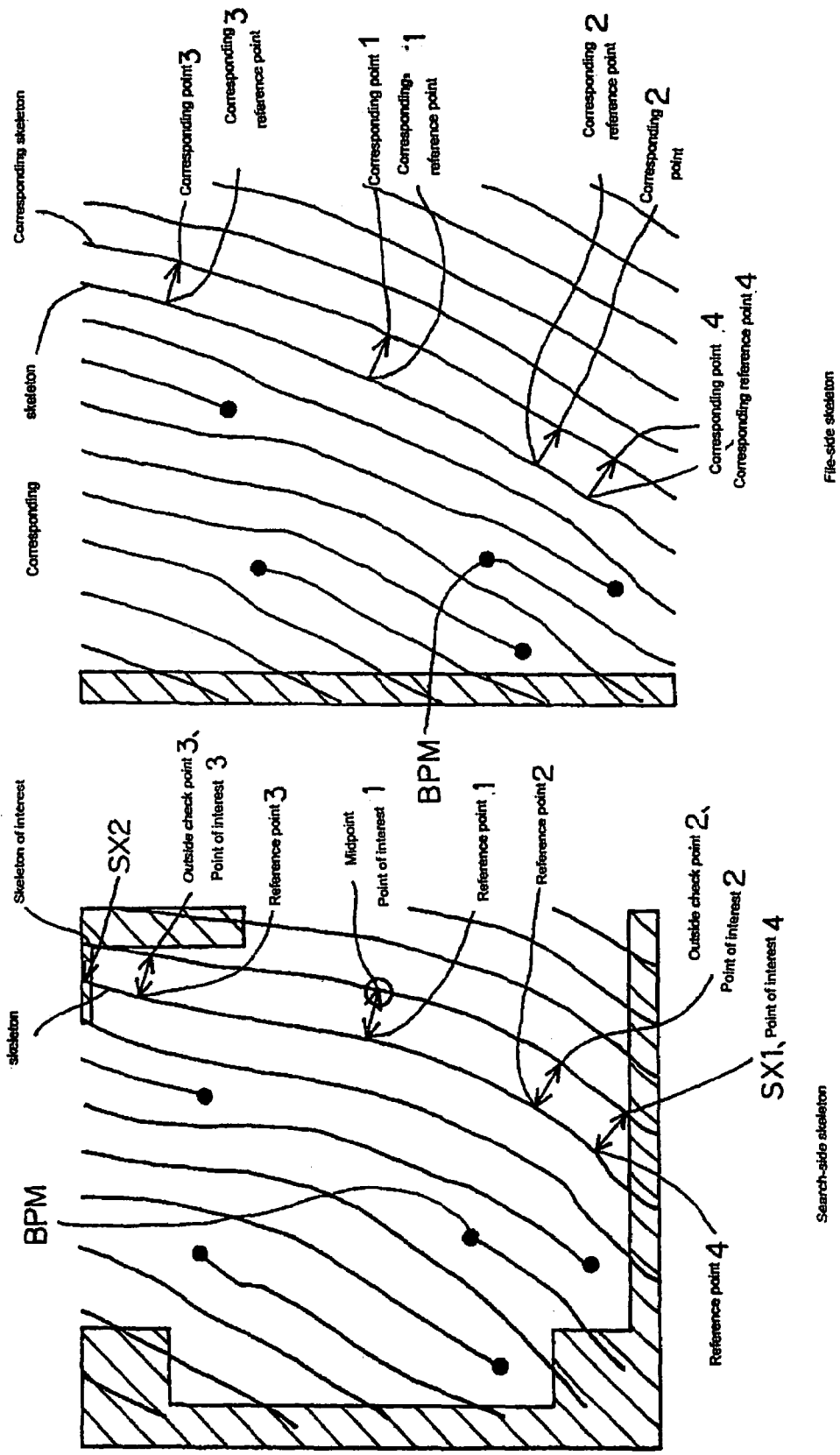
FIGS. 32A and 32B are diagrams each for describing the processing for determining points of interest and corresponding points.

If a corresponding point can be determined before step A334 or A335, skeleton data matching unit 21 adds a point of interest at step A336. Generally, at the start of step A336, there exists one set or more of a point of interest and a corresponding point in combination. If there is no point of interest outside of a certain point of interest (toward the end of the skeleton of interest), a skeleton point spaced from the point of interest outward by a constant distance is designated as an outside check point. FIG. 31A shows a single outside check point, while FIG. 32A shows two outside check points.

After determining the outside check point(s), skeleton data matching unit 21 draws a perpendicular from the outside check point down to an adjacent skeleton, i.e., an adjacent skeleton adjacent in the region which includes the BPM, when viewed from the skeleton of interest, and checks whether or not the intersection of the perpendicular with the adjacent skeleton (the foot of the perpendicular), if any, can be a reference point. Specifically, skeleton data matching unit 21 designates the foot of the perpendicular as a reference point when the foot of perpendicular is a determinate skeleton point, and there exists a corresponding point to the F-side. Subsequently, skeleton data matching unit 21 draws a perpendicular from the reference point down to the skeleton of interest, and designates the intersection of the perpendicular with the skeleton of interest (the foot of perpendicular), if any, as a point of interest. This point of interest may coincide with the outer check point or may slightly shift therefrom. Next, skeleton data matching unit 21 draws a perpendicular from the corresponding reference point on the file side down to the corresponding skeleton on the file side, and determines the foot of the perpendicular as a corresponding point.

After determining a new point of interest, skeleton data matching unit 21 determines a new outside check point at a location spaced further outward by a constant distance, and determines a point of interest and a corresponding point in a similar manner. When a skeleton of interest has extensive end point SX at the outer end, skeleton data matching unit 21 regards this extensive end point as an outside check point, and determines a point of interest and a corresponding point in a similar manner. When skeleton data matching unit 21 cannot determine a reference point, a point of interest or a corresponding point for an outside check point, or when a perpendicular has a length equal to or larger than a predetermined value, skeleton data matching unit 21 terminates the processing for the outside check point. This concludes the description on step A336.

After step A336, skeleton data matching unit 21 performs the correspondence of skeleton points which exist in a portion sandwiched between two points of interest with the F-side. If there are a plurality of sets of points of interest and corresponding points at the end of step A336, skeleton data matching unit 21 performs the correspondence with the F-side for each of skeleton points in a portion sandwiched between the points of interest. This correspondence is performed in a manner similar to sub-step A3-1, regarding any of the two points of interest as determinate paired minutiae.

A skeleton point may exist outside the point of interest which exists at the outermost location on a skeleton of interest (a point of interest which has a corresponding point on the F-side). On the other hand, only one point of interest may exist up to the end of step A338. In this event, at step A338, skeleton data matching unit 21 performs the correspondence of skeleton points which exist outside of these points of interest with the F-side. This correspondence is performed in a manner similar to sub-step A3-1, regarding the points of interest as determinate paired minutiae, and regarding a sequence of skeleton points existing outside of the points of interest as a skeleton unit. This concludes the description on the processing at step A3.

Next, description will be made on the processing at step A4. The correspondence of skeleton points on the S-side to those in the F-side has been completed at the start of step A4. At step A4, skeleton data matching unit 21 calculates the length of continuous determinate skeleton points with respect to each skeleton on the S-side.

After calculating the length LMS of a series of determinate skeleton points for each skeleton, skeleton data matching unit 21 multiplies the length by modification coefficient K(L) to calculate the product. K(L) is determined in accordance with the length LMS of determinate skeleton points. When LMS$\leq$10, K(L)=0.5.

When 10<LMS$\leq$50, K(L) is determined by the following equation (2):

$$K(L)=0.0125\times(LMS-10)+0.5 \quad (2)$$

When 50<LMS<100, K(L) is determined by the following equation (3):

$$K(L)=0.01\times(LMS-50)+1.0 \quad (3)$$

When 100<LMS<200, K(L) is determined by the following equation (4);

$$K(L)=0.005\times(LMS-100)+1.5 \quad (4)$$

when 200<LMS, K(L) is determined by the following equation (5):

$$K(L)=0.003\times(LMS-100)+2.0 \quad (5)$$

After calculating the product of length LMS and modification coefficient K(L) for each S-side skeleton, skeleton data matching unit 21 calculates the total sum of the products. The total sum is represented by $\Sigma$(LMS$\times$K(L)).

Skeleton data matching unit 21 also finds the total sum of penalties that have occurred in Steps A1 to A3. This total sum is the sum of P(m) at the time of completion of Step A1, P(m) at the time of completion of Step A2, and penalties k1 that have occurred in Step A3. This total sum of penalties is represented by $\Sigma$(P). The matching score of the skeleton SkelScore is then calculated by formula (6).

$$\text{SkelScore}=\Sigma(LMS\times K(L)) \text{ to } \Sigma(P)\times KP \quad (6)$$

Coefficient KP is the modification coefficient for $\Sigma$(P), and is, for example, KP=1. The calculation of SkelScore completes Step A4.

The skeleton data matching process by skeleton data matching unit 21 has been explained hereinabove. When the skeleton data matching process has been carried out in this way, the result SkelScore is transmitted to matching score merging unit 22.

Matching score merging unit 22 merges SkelScore with the matching score of minutiae that was calculated by minutia matching unit 19 and calculates a matching score that takes into consideration both minutiae and skeletons. For example, the geometric mean or the arithmetic mean of the SkelScore and the matching score of minutiae is calculated as the matching score. Here, the selectivity capability (matching capability) of minutia matching unit 19 or skeleton data matching unit 21 may be converted to a numerical value and this value then weighted to calculate the arithmetic mean or geometric mean. Matching result output unit 23 then supplies the calculation result of matching score merging unit 22 to the outside.

The fingerprint matching device of the present embodiment establishes correspondence between the S-side and F-side not only for minutiae but also for skeleton points such as continuation points C, whereby fingerprint matching can be carried out even when the number of minutiae is limited. Matching can therefore be carried out for latent fingerprints having a small area.

In addition, the modification of skeleton data in Step A2 enables an improvement in the matching accuracy even when skeleton data cannot be extracted accurately. In other words, even when skeleton data have been produced in which a point that is actually an endpoint is taken to be a bifurcation, the skeleton data can be modified and then matched such that the skeleton structures on the S-side and F-side are recognized to be the same, thereby enabling an improvement in matching accuracy.

In addition, the coordinates of each point are typically easily influenced by distortion. When determining determinate skeleton points in the present invention, however, rather than matching the coordinates of the S-side and the F-side, the determinate ending points are taken as starting points and the determinate skeleton points are then determined using the positional relations with already determinate points as a reference. As a result, the influence of distortion can be impeded even when distortion occurs in the fingerprint images.

In the present embodiment, the correspondence means, rating means, skeleton data modification means, and base paired minutia determination means are all realized by skeleton data matching unit 21.

Explanation next regards another embodiment of the present invention.

In the fingerprint matching devices that are shown in each of FIG. 1 and FIG. 2, minutia extraction unit 15, minutia matching unit 19, and skeleton data matching unit 21 are each provided as separate constituent elements. The present invention is not limited to this form, and may be a construction in which a single constituent element realizes the functions of minutia extraction unit 15, minutia matching unit 19, and skeleton data matching unit 21.

In addition, rather than extracting minutiae from the skeleton data that have been extracted by skeleton extraction unit 13, minutia extraction unit 15 may also again extract minutiae from skeleton data that have been modified by skeleton data matching unit 21. In addition, the minutiae that have been extracted a second time may be used to perform the process of matching minutiae by means of minutia matching unit 19 and the process of matching skeleton data by skeleton data matching unit 21.

When calculating the skeleton matching score SkelScore in Step A4, SkelScore may also be calculated based on the area that is enclosed by determinate skeletons rather than on the length LMS of continuous determinate skeleton points. In this case, skeleton data matching unit 21 executes the following process as Step A4. The processes up to Step A3 are the same as the processes that have already been described.

At the beginning of Step A4, skeleton data matching unit 21 extends straight lines a fixed distance in a horizontal, vertical, and two diagonal directions from each pixel for all of the S-side pixels that contain not only black pixels but white pixels as well. This distance may be, for example, on the order of twice the average ridgeline width (for example, approximately 20 pixels). If at least one straight line of the straight lines that extend from one pixel crosses the two adjacent skeletons that extend along either side of that pixel, and moreover, if the intersections between that straight line and the two adjacent skeletons are determinate skeleton points, this pixel will be determined to be a pixel that is enclosed by determinate skeletons.

If all straight lines that extend in the horizontal, vertical, and two diagonal directions from one pixel meet any of the following three conditions, the pixel is determined not to be a pixel that is enclosed by determinate skeletons. The first condition is that the straight line does not encounter an adjacent skeleton even though it extends a fixed distance (approximately 20 pixels). The second condition is that the straight line encounters an unclear area before it strikes an adjacent skeleton. The third condition is that the intersection of the straight line with an adjacent skeleton is not a determinate skeleton point. However, regarding the determinate skeleton point, a pixel is preferably determined to be a pixel that is enclosed by determinate skeletons even though these conditions are met.

Figure 33A:
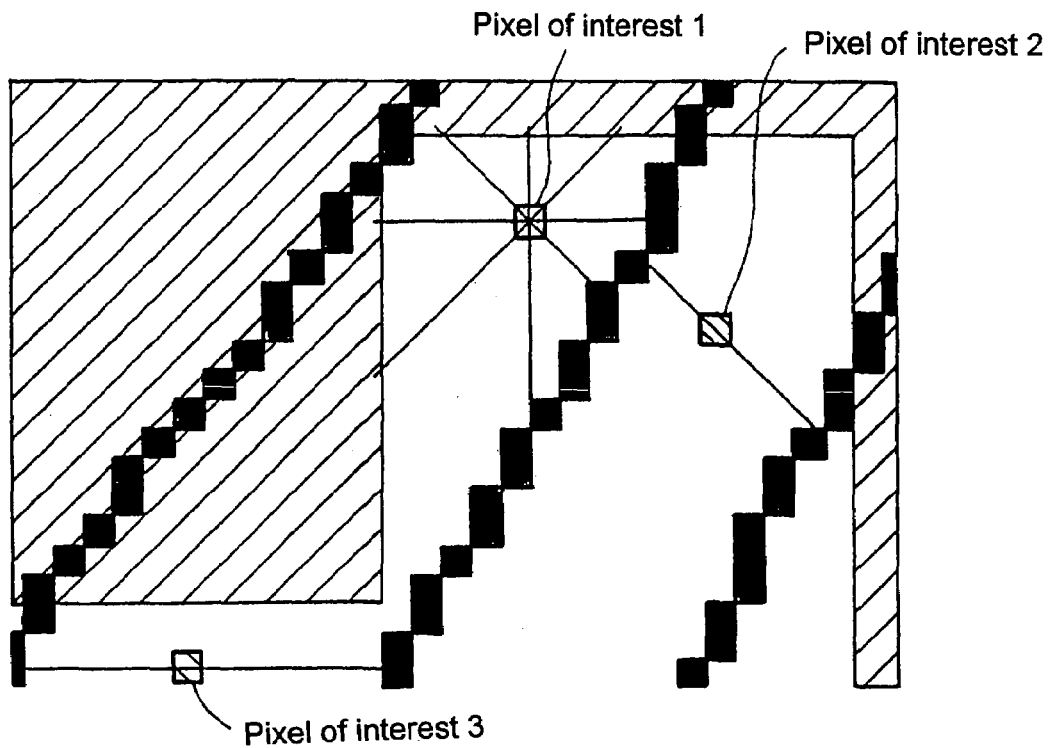
FIG. 33A shows an example of how to judge a pixel if it is enclosed by determinate skeletons.
Figure 33B:
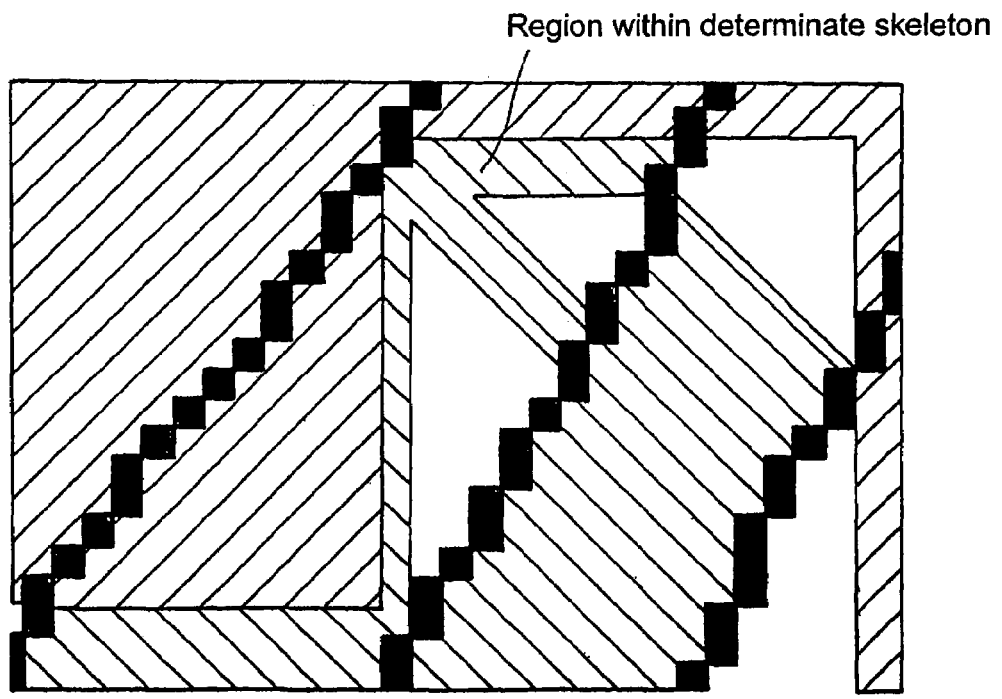
FIG. 33B shows an example of pixels that are enclosed by determinate skeletons.

FIGS. 33A and 33B show a specific example of a pixel that is enclosed by determinate skeletons and a pixel that is not enclosed. In FIG. 33A, the regions that are filled in by diagonal lines are unclear areas. Skeleton points that are located in unclear regions are all non-determinate skeleton points, and skeleton points that are located outside unclear regions are all determinate skeleton points. A straight line that extends horizontally from pixel 1, which is the object of our attention in FIG. 33A, strikes an adjacent skeleton on one side, but strikes an unclear region on the other. The same is true of lines that extend vertically and diagonally, and accordingly, straight lines that extend from pixel of interest 1 all meet the second condition, and pixel of interest 1 is therefore not enclosed by determinate skeletons. In contrast, a straight line that extends diagonally from pixel of interest 2 strikes two adjacent skeletons that lie on either side of pixel of interest 2, and further, these intersections are determinate skeleton points. Accordingly, pixel of interest 2 is determined to be enclosed by determinate skeletons. The same is true for pixel of interest 3.

A similar process of determining whether or not a pixel is enclosed by determinate skeletons is carried out for all pixels. In FIG. 33B, regions in which pixels are present that are determined to be enclosed by determinate skeletons are distinguished from regions in which pixels are present that are determined not to be enclosed by determinate skeletons. In FIG. 33B, regions in which pixels exist that are determined to be enclosed by determinate skeletons are shown as "regions within determinate skeletons." The number of pixels that have been determined to be enclosed by determinate skeletons is considered to be the area Q of the regions that are enclosed within determinate skeletons. SkelScore is calculated by formula (7) based on this area Q:

$$\text{SkelScore} = Q - \Sigma(P) \times KP \qquad (7)$$

As already explained, $\Sigma(P)$ is the total sum of the penalties that occurred from Steps A1 to A3, and KP is the modification coefficient for $\Sigma(P)$. The value of KP is, for example, 1.

When skeleton matching is performed for a long narrow region, calculating SkelScore based on the length of the determinate skeleton results in a comparatively large value, but when SkelScore is calculated based on area, this adverse effect is reduced. Nevertheless, the superiority of the method based on the length of the determinate skeleton or the method based on area cannot be stated without qualifications. SkelScore can also be calculated based on both the length of the determinate skeleton and area and then taking the mean after weighting.

The process of matching skeleton data in each of the embodiments described so far, i.e., the process of establishing a correspondence between skeleton points, presupposes that at least three sets of corresponding points are included in the paired minutia list. If there are two or fewer sets of paired minutiae included in the paired minutia list, skeleton data matching unit 21 halts the execution of the skeleton data matching process. If the accuracy of skeleton matching can be improved, the skeleton data matching process need not be halted when there are two or fewer sets of paired minutiae. An embodiment in which the accuracy of skeleton matching can be improved is next described.

In the present embodiment, skeleton data matching unit 21 designates sets of points that form pairs on the S-side and F-side by way of an input device such as a mouse. Skeleton data matching unit 21 determines the sets of determinate skeleton points based on the designated sets of points, and taking these sets of determinate skeleton points as the sets of paired minutiae, can execute the processes of Step A0 and the succeeding steps that are shown in FIG. 9.

Figures 34A, 34B, 34C:
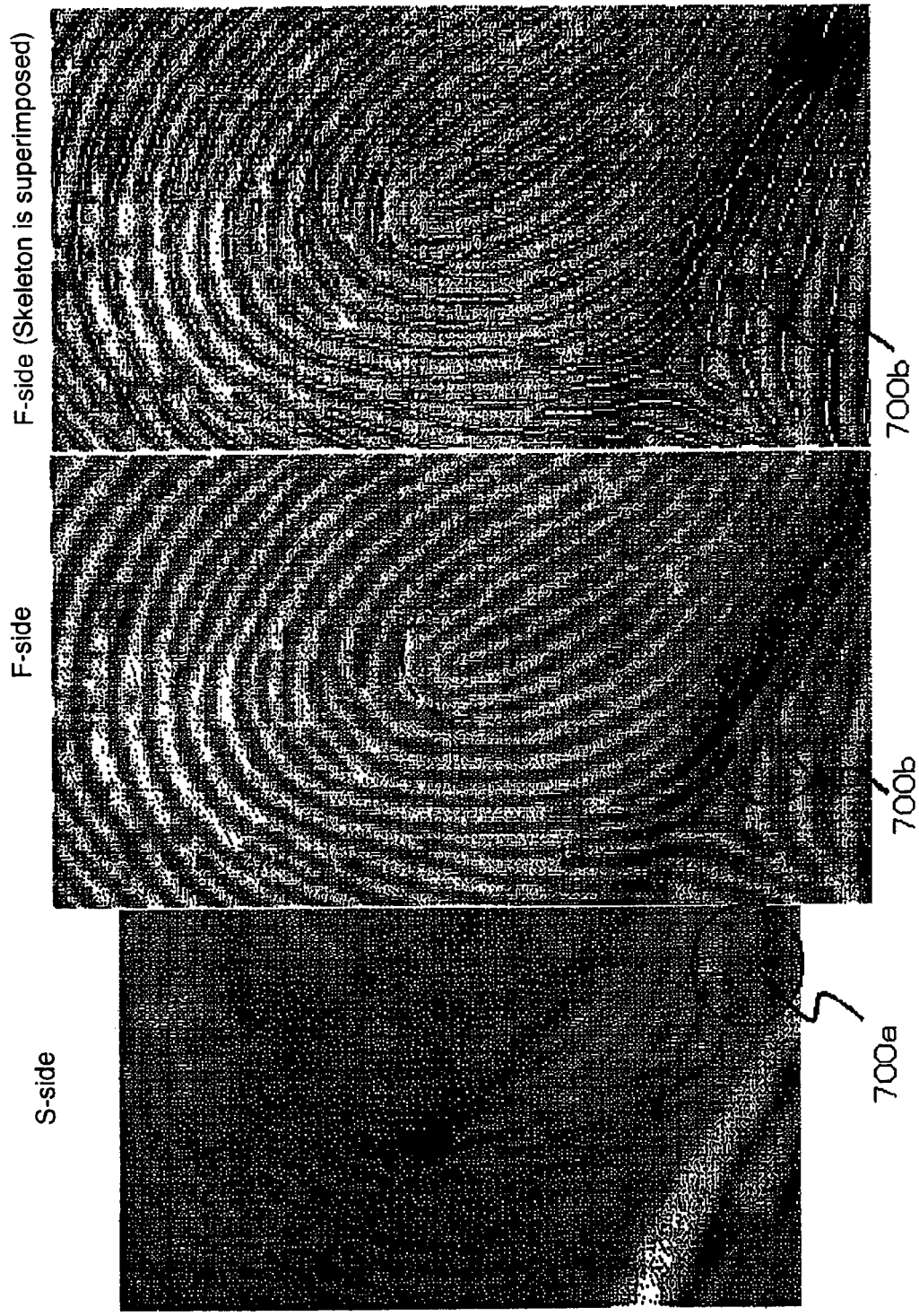
FIGS. 34A to 34C show examples of screens that prompt the designation of points that become pairs.

An example of determining sets of determinate minutiae based on designated sets of points is next described. Skeleton data matching unit 21 displays an S-side image and an F-side image on a display device, and prompts the examiner to designate the sets of points that form pairs. For example, the images shown in FIGS. 34A and 34B are displayed. The displayed image is not necessarily only ridgelines such as shown in FIG. 34B, but may also shows an image in which a skeleton such as shown in FIG. 34C is superposed. However, the circles shown in FIGS. 34A to 34C are here shown for the sake of expedience, and these circles are not actually displayed. In the example shown in FIGS. 34A to 34C, points (short ridges) 700a and 700b are present that are ignored during the extraction and matching of minutiae.

The examiner designates S-side point (short ridge) 700a and F-side point 700b by means of, for example, a mouse. When points 700a and 700b are designated by means of a mouse, skeleton data matching unit 21 drops a perpendicular line from S-side point 700a to the adjacent skeleton to specify the point that is to be the foot of a perpendicular line. Similarly, a perpendicular line is dropped from point 700b on the F-side to the adjacent skeleton to specify the point that is the foot of the perpendicular line. Skeleton data matching unit 21 then takes the points that are the feet of the perpendicular lines as the determinate skeleton points and establishes these points as a set of paired minutiae. The processes following Step A0 can then proceed. When performing the process of establishing correspondence between skeleton points on a skeleton unit that includes these determinate skeleton points in Step A3, the process of establishing correspondence may be performed by taking the points that have been determined as the determinate skeleton points as starting points. When performing the process of establishing correspondence between skeleton points for a skeleton unit that takes these determinate skeleton points as starting points, sub-Step A3-1 is applied in the course of the process of Step A3.

Figure 35:
FIG. 35 shows an example of the peak of a innermost loop.

When the set of points 700a and 700b is designated, skeleton data matching unit 21 determines determinate minutiae on the skeleton that is adjacent to points 700a and 700b. In some cases, the set of points that have been determined by way of a mouse are taken as the set of determinate skeleton points without alteration. For example, when the set of the peak of a innermost loop on the S-side and the peak of a core loop line on the F-side are entered, the entered set of S-side peak and F-side peak can be determined as the set of determinate skeleton points without alteration. The innermost loop is the ridge that is located in the innermost portion of a fingerprint. As shown in FIG. 35, the peak of a innermost loop is a point that is located in the most outwardly projected position of the innermost loop. In the example that is shown in FIGS. 34A to 34C, the peak of the innermost loop in the S-side image is not confirmed. If the peak of the innermost loop in the S-side image is provisionally confirmed, this point and the peak of the F-side core loop line can be set as a pair and designated. The peak of the F-side innermost loop can be confirmed within the region that is indicated by a broken line.

It is also possible to apply as input not only the sets of points (short ridges) and the peak of innermost loops, but also the sets of points that form the "island" shown in FIG. 12 and the points that are located in the swelled portion of the ridge, and skeleton data matching unit 21 may then specify the sets of determinate skeleton points based on these sets.

If the sets of determinate skeleton points are specified based on the sets of points that are designated by the examiner and the process of establishing correspondence of skeleton points is performed by using these determinate skeleton points as starting points, the matching accuracy can be improved. As a result, the skeleton matching can be performed with sufficient accuracy even when only two or fewer sets of paired minutiae are included in the paired minutia list.

In the flow chart shown in FIG. 18, sub-step A2-2 is followed by sub-step A2-3. However, the process of sun-step A2-3 can be omitted. In other words, at least F-side skeleton data is modified to exclude the pair of two minutiae in the opposing relationship. In this case, the S-side skeleton having a minutia in the opposing relationship is removed from the object of correspondence process to the F-side at step A3.

In Step A3 in the above-described explanation, a case was shown for specifying F-side corresponding points that correspond to S-side skeleton points. However, the matching accuracy may be improved by specifying not only F-side corresponding points that correspond to S-side skeleton points but also S-side corresponding points that correspond to F-side skeleton points in this Step A3.

A preferable embodiment of the present invention was described in the foregoing explanation, but the range of application of the present invention is not limited to fingerprint matching. For example, the present invention can also be applied to the matching of images of streaked patterns other than fingerprints. As an example, the present invention can be applied to palmprint matching.

While preferred embodiments of the present invention have been described using specific terms, such description is for illustrative purposes only, and it is to be understood that changes and variations may be made without departing from the spirit or scope of the following claims.

What is claimed is:

1. A streaked pattern image matching method for matching a first streaked pattern image and a second streaked pattern image, said method comprising steps of:

extracting skeleton pixel data that indicate skeletons, said skeletons being lines obtained by thinning each streak of a streaked pattern image;

establishing a correspondence between skeleton pixels by specifying pixels among the skeleton pixels of said second streaked pattern image that correspond to skeleton pixels of said first streaked pattern image;

retrieving all pixels of said first streaked pattern image and for each first pixel which does not belong to a skeleton thereof, determining whether at least a straight line extending either side of the first pixel crosses two adjacent skeletons at two points for which a correspondence with skeleton pixels of said second streaked pattern image has been found and in the affirmative counting the first pixel as an enclosed pixel; and rating a degree of matching between said first streaked pattern image and said second streaked pattern image based on a number of the enclosed pixels.

2. The method according to claim 1, wherein:
of minutiae in the skeletons, paired minutiae of said first streaked pattern image and said second streaked pattern image that have been placed in correspondence are specified; and
if paired minutiae, for which the type on said first streaked pattern image side and on said second streaked pattern image side are identical, are present on the skeletons that are the object of the process of establishing correspondence, pixels of these paired minutiae are taken as starting points and pixels are specified from among the skeleton pixels of said second streaked pattern image that correspond to the skeleton pixels of said first streaked pattern image.

3. The method according to claim 1, wherein:
pixels from among skeleton pixels of said second streaked pattern image that correspond to skeleton pixels of said first streaked pattern image are specified based on the positional relation between skeleton pixels or pixels of paired minutiae in the skeletons that have already been placed in correspondence and skeleton pixels of said first streaked pattern image and skeleton pixels of said second streaked pattern image that are next to undergo the process of establishing correspondence.

4. The method according to claim 1, wherein said first streaked pattern image and said second streaked pattern image are both fingerprint images.

5. A streaked pattern image matching device for matching a first streaked pattern image and a second streaked pattern image, comprising:
skeleton extraction means for extracting data of skeleton pixels that indicate skeletons, which are lines obtained by thinning streaks of each of said streaked pattern images;
correspondence means for carrying out a process of establishing correspondence between skeleton pixels by specifying pixels from among the skeleton pixels of said second streaked pattern image that correspond to the skeleton pixels of said first streaked pattern image;
means for retrieving all pixels in said first streaked pattern image;
means for determining, for each first pixel which does not belong to a skeleton thereof, whether at least a straight line extending either side of the first pixel crosses two adjacent skeletons at two points for which a correspondence with skeleton pixels of said second streaked pattern image has been found;
means for counting the first pixel as an enclosed pixel in the affirmative; and
rating means for rating degree of matching between said first streaked pattern image and said second streaked pattern image based on a number of the enclosed pixels.

6. The device according to claim 5, further comprising minutia matching means for specifying, of minutiae on skeletons, paired minutiae for which correspondence is established between said first streaked pattern image and said second streaked pattern image;
wherein, when paired minutiae, for which type is identical on said first streaked pattern image side and said second streaked pattern image side, are located on a skeleton that is the object of the process of establishing correspondence, said correspondence means takes the pixels of said paired minutiae as starting points and specifies pixels among the skeleton pixels of said second streaked pattern image that correspond to skeleton pixels of said first streaked pattern image.

7. The device according to claim 6, wherein said correspondence means specifies pixels from among skeleton pixels of said second streaked pattern image that correspond to skeleton pixels of said first streaked pattern image based on a positional relation between skeleton pixels or pixels of paired minutiae that have already been placed in correspondence and skeleton pixels of said first streaked pattern image and skeleton pixels of said second streaked pattern image that are next to undergo the process of establishing correspondence.

8. The streaked pattern image matching device according to claim 6, further comprising a skeleton data modification means for modifying skeleton data of either one of said streaked pattern images so that the type of the paired minutiae that have been specified by said minutia matching means is identical on said first streaked pattern image side and said second streaked pattern image side;
wherein said correspondence means uses skeleton data that have been modified by means of said skeleton data modification means to specify those pixels from among skeleton pixels of said second streaked pattern image that correspond to skeleton pixels of said first streaked pattern image.

9. The device according to claim 8, wherein said skeleton data modification means modifies at least the skeleton data of said second streaked pattern image such that sets of two minutiae that are in an opposing relation are excluded.

10. The device according to claim 8, wherein said minutia matching means again specifies paired minutiae based on skeleton data that have been modified by said skeleton data modification means.

11. The device according to claim 6, further comprising a base paired minutia determination means for determining, from among paired minutiae that have been specified by said minutia matching means, base paired minutiae that serve as a reference when determining order of skeletons that are to undergo the process of establishing correspondence;
wherein said correspondence means determines the order of skeletons based on positional relations between each skeleton and base paired minutiae and then carries out the process of establishing correspondence for each skeleton according to said order.

12. The device according to claim 6, wherein when points on said first streaked pattern image and points on said second streaked pattern image have been designated, said correspondence means determines points that constitute pairs on said first streaked pattern image side and said second streaked pattern image side based on designated points; and when performing the process of establishing
correspondence between skeleton pixels in skeletons that include said points that have been determined, takes said determined points as starting points and specifies those pixels from among the skeleton pixels of said second streaked pattern image that correspond to skeleton pixels of said first streaked pattern image.

* * * * *